United States Patent
Harviainen et al.

(10) Patent No.: US 11,493,999 B2
(45) Date of Patent: Nov. 8, 2022

(54) SYSTEMS AND METHODS FOR PHYSICAL PROXIMITY AND/OR GESTURE-BASED CHAINING OF VR EXPERIENCES

(71) Applicant: PCMS Holdings, Inc., Wilmington, DE (US)

(72) Inventors: Tatu V. J. Harviainen, Helsinki (FI); Marko Palviainen, Espoo (FI)

(73) Assignee: PMCS HOLDINGS, INC., Wilmington, DE (US)

( * ) Notice: Subject to any disclaimer, the term of this patent is extended or adjusted under 35 U.S.C. 154(b) by 0 days.

(21) Appl. No.: 17/052,509

(22) PCT Filed: Apr. 26, 2019

(86) PCT No.: PCT/US2019/029425
§ 371 (c)(1),
(2) Date: Nov. 2, 2020

(87) PCT Pub. No.: WO2019/212902
PCT Pub. Date: Nov. 7, 2019

(65) Prior Publication Data
US 2021/0240279 A1    Aug. 5, 2021

Related U.S. Application Data

(60) Provisional application No. 62/666,549, filed on May 3, 2018.

(51) Int. Cl.
*G06F 3/01* (2006.01)
*H04L 67/131* (2022.01)

(52) U.S. Cl.
CPC .............. *G06F 3/017* (2013.01); *G06F 3/013* (2013.01); *H04L 67/131* (2022.05)

(58) Field of Classification Search
CPC .......... G06F 3/017; G06F 3/013; G06F 3/011; G06F 3/012; H04L 67/38;
(Continued)

(56) References Cited

U.S. PATENT DOCUMENTS

| | | | |
|---|---|---|---|
| 8,006,274 B2 | 8/2011 | Scott, III | |
| 9,245,583 B2 | 1/2016 | Bhogal | |

(Continued)

FOREIGN PATENT DOCUMENTS

| | | |
|---|---|---|
| CN | 107612947 A | 1/2018 |
| JP | 2017142816 A | 8/2017 |
| WO | 2018005560 A1 | 1/2018 |

OTHER PUBLICATIONS

Francke, Hardy, et al., "Real-time hand gesture detection and recognition using boosted classifiers and active learning". Advances in Image and Video Technology, 2007, pp. 533-547 (15 pages).

(Continued)

*Primary Examiner* — Richard J Hong
(74) *Attorney, Agent, or Firm* — Invention Mine LLC

(57) ABSTRACT

Some embodiments of a method may include tracking a distance between a local VR device and a remote VR device; selecting an experience-sharing mode from a plurality of experience-sharing modes based on the tracked distance; and providing a different degree of immersive user experience to a user at the local VR device depending on the selected experience-sharing mode, wherein as the distance between the local VR device and the remote VR device decreases, the experience-sharing mode changes and the degree of immersive user experience increases. Some embodiments of another method may include detecting a gesture made by a user; selecting an immersiveness mode from a plurality of immersiveness modes based on the detected gesture; and providing a degree of immersive user (Continued)

experience to a local VR device user depending on the selected immersiveness mode.

20 Claims, 21 Drawing Sheets

(58) Field of Classification Search
CPC .. H04N 21/44218; G06T 19/006; G09B 5/02; A63F 13/493; A63F 13/5255; A63F 13/86; A63F 13/65
See application file for complete search history.

(56) References Cited

U.S. PATENT DOCUMENTS

| | | | |
|---|---|---|---|
| 9,818,225 B2 | 11/2017 | Mao | |
| 9,842,433 B2 | 12/2017 | Luo | |
| 2014/0125698 A1* | 5/2014 | Latta | A63F 13/65 345/633 |
| 2014/0298382 A1 | 10/2014 | Jo | |
| 2015/0024368 A1* | 1/2015 | King, Jr. | G09B 5/02 434/365 |
| 2015/0213650 A1 | 7/2015 | Barzuza | |
| 2015/0215351 A1 | 7/2015 | Barzuza | |
| 2015/0235434 A1* | 8/2015 | Miller | G06F 3/013 345/633 |
| 2016/0027218 A1 | 1/2016 | Salter | |
| 2016/0093108 A1* | 3/2016 | Mao | A63F 13/493 345/633 |
| 2016/0173826 A1 | 6/2016 | Kleiner | |
| 2016/0180495 A1* | 6/2016 | Thulasimani | G06T 19/006 345/545 |
| 2016/0209658 A1 | 7/2016 | Zalewski | |
| 2016/0227172 A1 | 8/2016 | Safaei | |
| 2016/0320833 A1 | 11/2016 | Schuman | |
| 2016/0350973 A1 | 12/2016 | Shapira | |
| 2018/0005429 A1* | 1/2018 | Osman | G06T 19/006 |
| 2018/0093185 A1* | 4/2018 | Black | A63F 13/86 |
| 2018/0096519 A1* | 4/2018 | Tokubo | G06F 3/012 |
| 2018/0182172 A1* | 6/2018 | Vinmani | G06F 3/011 |
| 2018/0311585 A1* | 11/2018 | Osman | A63F 13/5255 |
| 2019/0230142 A1* | 7/2019 | He | H04N 21/44218 |

OTHER PUBLICATIONS

Mautz, Rainer "Overview of current indoor positioning systems." Geodezija ir kartografija, vol. 35, No. 1, 2009, pp. 18-22 (5 pages).
Dardas, Nasser H., et al. "Real-Time Hand Gesture Detection and Recognition Using Bag-of-Features and Support Vector Machine Techniques." IEEE Transactions on Instrumentation and Measurement, vol. 60, No. 11, 2011, pp. 3592-3607 (16 pages).
International Search Report and Written Opinion of the International Searching Authority for PCT/US2019/029425 dated Jul. 9, 2019, 13 pages.
U.S. Appl. No. 62/479,962, filed Mar. 31, 2017.
"Virtual Brewery Adventure—Equipment Configuration" Telepresence Research, Inc. available at Virtual Brewery Adventure (telepresence.com) last accessed Jan. 7, 2022.

* cited by examiner

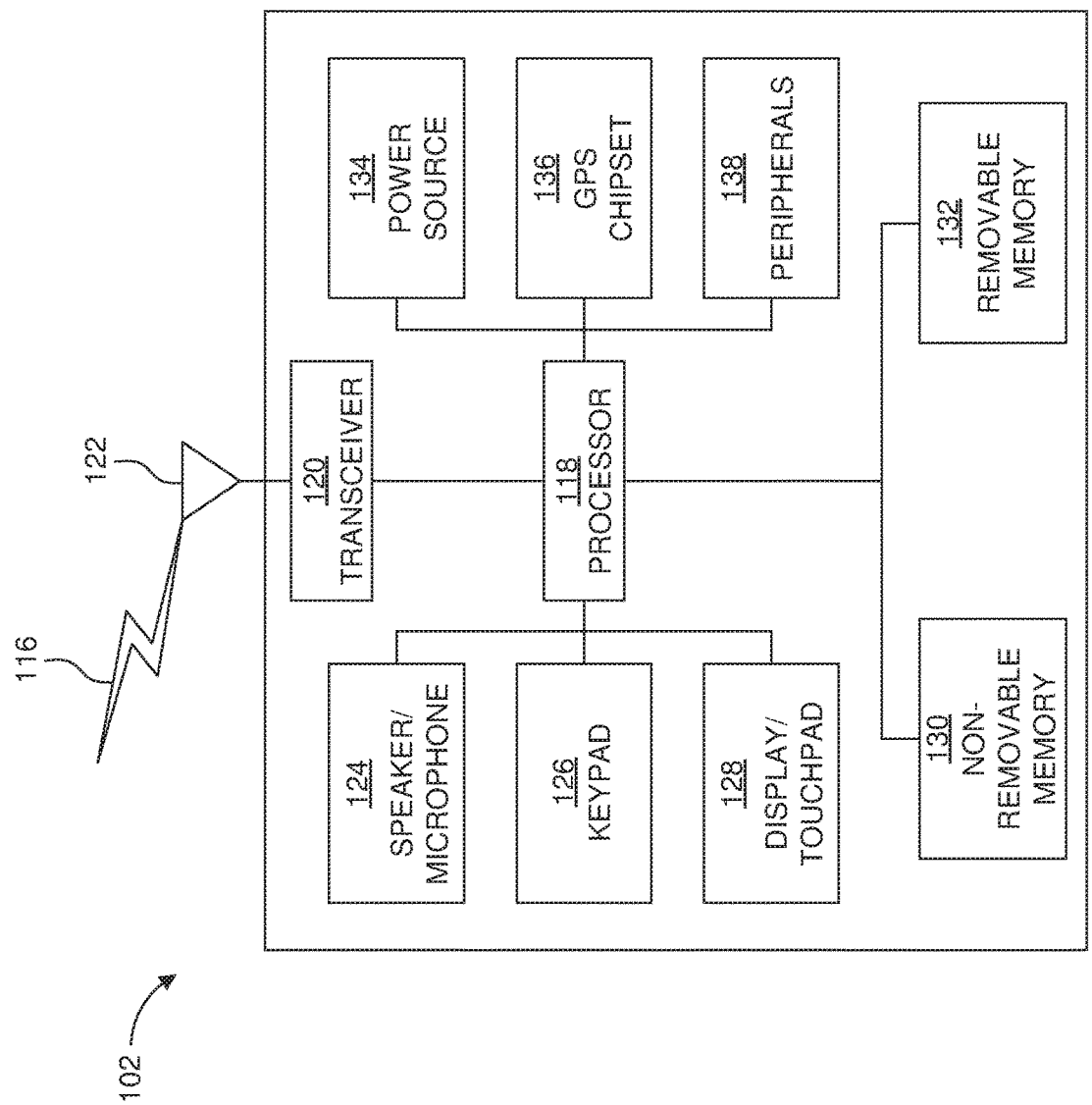

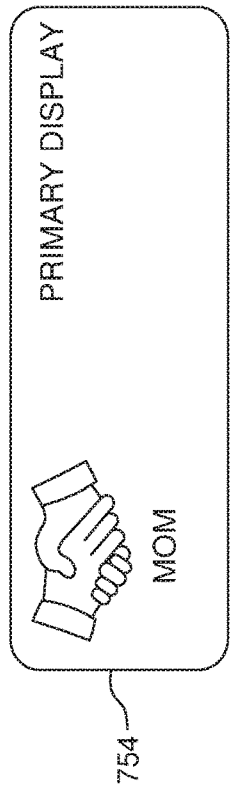
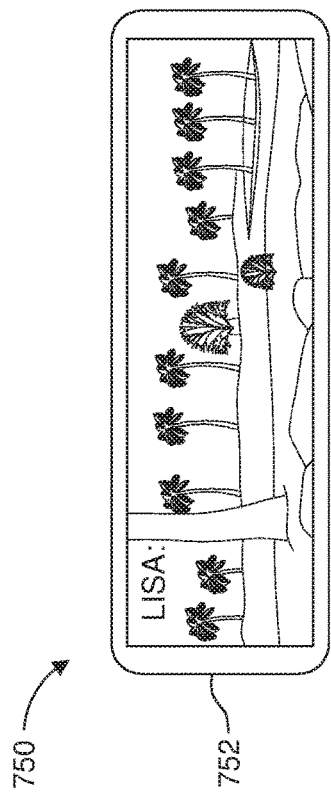
FIG. 7D
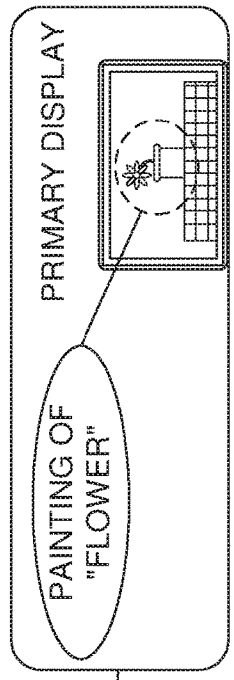
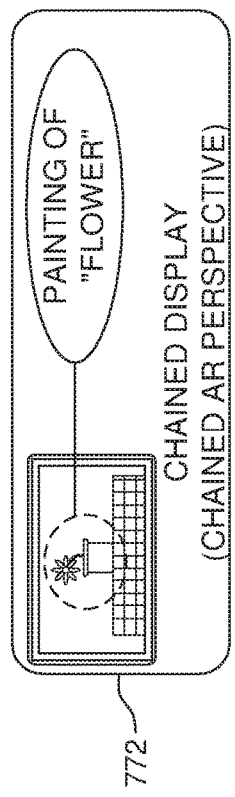
FIG. 7E
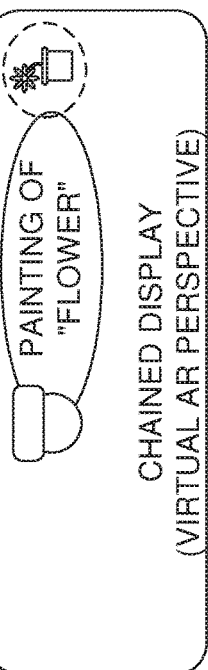
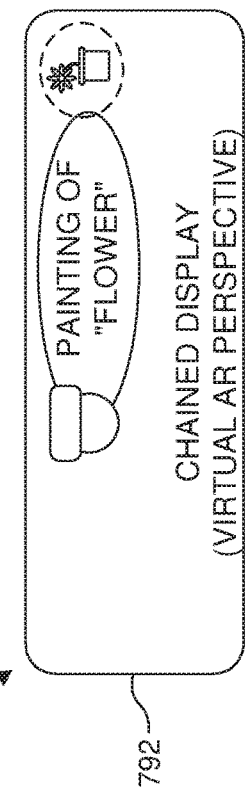
FIG. 7F ESTABLISHING A CONNECTION BETWEEN A FIRST VIRTUAL REALITY (VR) DEVICE AND A SECOND VR DEVICE
1302

DETECTING A FIRST GESTURE OF A USER
1304

SELECTING A FIRST LEVEL OF IMMERSIVENESS BASED ON THE FIRST GESTURE OF THE USER
1306

RETRIEVING A FIRST SET OF CONTENT BASED ON THE FIRST LEVEL OF IMMERSIVENESS
1308

DISPLAYING THE FIRST SET OF CONTENT ON A DISPLAY OF THE FIRST VR DEVICE
1310

DETECTING A SECOND GESTURE OF THE USER
1312

SELECTING A SECOND LEVEL OF IMMERSIVENESS BASED ON THE SECOND GESTURE OF THE USER
1314

RETRIEVING A SECOND SET OF CONTENT BASED ON THE SECOND LEVEL OF IMMERSIVENESS
1316

DISPLAYING THE SECOND SET OF CONTENT ON THE DISPLAY OF THE FIRST VR DEVICE
1318

SYSTEMS AND METHODS FOR PHYSICAL PROXIMITY AND/OR GESTURE-BASED CHAINING OF VR EXPERIENCES

CROSS-REFERENCE TO RELATED APPLICATIONS

The present application is a national stage application under 35 U.S.C. § 371 of International Application No. PCT/US2019/029425, entitled "SYSTEMS AND METHODS FOR PHYSICAL PROXIMITY AND/OR GESTURE-BASED CHAINING OF VR EXPERIENCES," filed on Apr. 26, 2019, which claims benefit under 35 U.S.C. § 119(e) from U.S. Provisional Patent Application Ser. No. 62/666,549, entitled "Systems and Methods for Physical Proximity and/or Gesture-Based Chaining of VR Experiences," filed May 3, 2018, all of which are hereby incorporated by reference in their entirety.

BACKGROUND

Viewing virtual reality (VR) content in a head mounted display (HMD) device may isolate the HMD user from the physical environment, which may make it difficult for other users to follow the VR content that is displayed for the HMD user.

SUMMARY

An example method in accordance with some embodiments may include: establishing a connection between a local virtual reality (VR) device and a remote VR device; determining a distance between the local VR device and the remote VR device; selecting a first experience-sharing level based on the distance; retrieving a first set of content based on the first experience-sharing level; displaying the first set of content on a display of the local VR device; determining change in the distance between the local VR device and the remote VR device; selecting a second experience-sharing level based on the changed distance; retrieving a second set of content based on the second experience-sharing level; and displaying the second set of content on the display of the local VR device.

For some embodiments of the example method, the first set of content may include a first shared experience between a user of the local device and a user of the remote device, and the second set of content may include a second shared experience between the user of the local device and the user of the remote device.

For some embodiments of the example method, the first shared experience may be more immersive than the second shared experience.

For some embodiments of the example method, the first shared experience may be less immersive than the second shared experience.

For some embodiments of the example method, the first and second shared experiences may connect a user of the local device to an already existing VR experience session of a user of the remote device.

For some embodiments of the example method, determining the change in the distance may be determined after detecting the distance is below an absolute distance threshold.

For some embodiments of the example method, determining the change in the distance may be determined after detecting the distance is between a first absolute distance threshold distance and a second absolute distance threshold.

For some embodiments of the example method, the first experience-sharing level may be associated with a first level of immersiveness with a user, the second experience-sharing level may be associated with a second level of immersiveness with the user, and the first level of immersiveness with the user may be greater than the second level of immersiveness with the user.

For some embodiments of the example method, displaying the first set of content may display a summary description of a VR experience of the remote VR device on a portion of the display of the local VR device.

For some embodiments of the example method, displaying the first set of content may display a visual representation of a VR experience of the remote VR device on a portion of the display of the local VR device.

For some embodiments of the example method, displaying the second set of content may display a VR experience of the remote VR device on the display of the local VR device in a fully immersive mode.

For some embodiments of the example method, displaying the second set of content on a display of the local VR device may include synchronizing displaying of the second set of content on the local VR device with the remote VR device.

Some embodiments of the example method may further include retrieving viewport information of the remote VR device based on the first experience-sharing level, wherein retrieving the first set of content may retrieve the first set of content further based on the viewport information.

Some embodiments of the example method may further include retrieving viewing information for the remote VR device, wherein displaying the first set of content may be further based on the viewing information for the remote device.

Some embodiments of the example method may further include: detecting a gesture of a user; and adjusting the viewing information based on the gesture of the user, wherein displaying the first set of content may be further based on the adjusted viewing information for the remote device.

Some embodiments of the example method may further include detecting a gesture of a user, wherein selecting the first experience-sharing level is further based on the gesture of the user.

Some embodiments of the example method may further include detecting a voice command of a user, wherein selecting the first experience-sharing level may be further based on the voice command of the user.

Some embodiments of the example method may further include: detecting an orientation of the remote VR device; and adjusting the first set of content to generate an adjusted first set of content based on the orientation of the remote VR device, wherein displaying the first set of content may display the adjusted first set of content on the display of the local VR device.

For some embodiments of the example method, the first set of content may include a plurality of VR objects, and the plurality of VR objects may include a subset of a set of VR objects displayed on the remote device.

An example apparatus in accordance with some embodiments may include: a processor; and a non-transitory computer-readable medium storing instructions that are operative, when executed by the processor, to perform an example method described above.

Another example method in accordance with some embodiments may include: establishing a connection between a first virtual reality (VR) device and a second VR device; detecting a first gesture of a user; selecting a first level of immersiveness based on the first gesture of the user; retrieving a first set of content based on the first level of immersiveness; displaying the first set of content on a display of the first VR device; detecting a second gesture of the user; selecting a second level of immersiveness based on the second gesture of the user; retrieving a second set of content based on the second level of immersiveness; and displaying the second set of content on the display of the first VR device.

For some embodiments of another example method, displaying the first set of content may display a summary description of a VR experience of the second VR device on a portion of the display of the first VR device.

For some embodiments of another example method, displaying the first set of content may display a visual representation of a VR experience of the second VR device on a portion of the display of the first VR device.

For some embodiments of another example method, displaying the second set of content may display a VR experience of the second VR device on the display of the first VR device in a fully immersive mode.

Some embodiments of another example method may further include retrieving viewport information of the second VR device based on the first experience-sharing level, wherein retrieving the first set of content may retrieve the first set of content further based on the viewport information.

Some embodiments of another example method may further include displaying, on the display of the first VR device, an avatar associated with a user of the remote VR device.

Another example apparatus in accordance with some embodiments may include: a processor; and a non-transitory computer-readable medium storing instructions that are operative, when executed by the processor, to perform another example method described above.

A further example method in accordance with some embodiments may include: establishing a connection between a local virtual reality (VR) device and a remote VR device; determining a distance between the local VR device and the remote VR device; selecting an experience-sharing level based on the distance; retrieving content based on the experience-sharing level; and displaying the content on the local VR device.

A further example apparatus in accordance with some embodiments may include: a processor; and a non-transitory computer-readable medium storing instructions that are operative, when executed by the processor, to perform a further example method described above.

Another further example method in accordance with some embodiments may include: tracking a distance between a local VR device and a remote VR device; selecting an experience-sharing mode from a plurality of experience-sharing modes based on the tracked distance; and providing a different degree of immersive user experience to a user at the local VR device depending on the selected experience-sharing mode, wherein as the distance between the local VR device and the remote VR device decreases, the experience-sharing mode may change and the degree of immersive user experience may increase.

For some embodiments of another further example method, providing the different degree of immersive user experience may include: retrieving content based on the experience-sharing level; and displaying the content on a display of the local VR device.

For some embodiments of another further example method, displaying the content may display a summary description of a VR experience of the remote VR device on a portion of the display of the local VR device.

For some embodiments of another further example method, displaying the content may display a visual representation of a VR experience of the remote VR device on a portion of the display of the local VR device.

For some embodiments of another further example method, displaying the content may display a VR experience of the remote VR device on the display of the local VR device in a fully immersive mode.

Another further example apparatus in accordance with some embodiments may include: a processor; and a non-transitory computer-readable medium storing instructions that are operative, when executed by the processor, to perform another further example method described above.

An additional example method in accordance with some embodiments may include: detecting a gesture made by a user; selecting an immersiveness mode from a plurality of immersiveness modes based on the detected gesture; and providing a degree of immersive user experience to a local VR device user depending on the selected immersiveness mode.

For some embodiments of an additional example method, providing the degree of immersive user experience may include: retrieving content based on an experience-sharing level; and displaying the content on a display of a local VR device.

For some embodiments of an additional example method, displaying the content may display a summary description of a VR experience of a remote VR device on a portion of the display of the local VR device.

For some embodiments of an additional example method, displaying the content may display a visual representation of a VR experience of a remote VR device on a portion of the display of the local VR device.

For some embodiments of an additional example method, displaying the content may display a VR experience of a remote VR device on the display of the local VR device in a fully immersive mode.

Some embodiments of an additional example method may further include: tracking a distance between the local VR device and the remote VR device; and changing the immersiveness mode based on the tracked distance, wherein as the distance between the local VR device and the remote VR device decreases, the immersiveness mode may change and the degree of immersive user experience may increase.

An additional example apparatus in accordance with some embodiments may include: a processor; and a non-transitory computer-readable medium storing instructions that are operative, when executed by the processor, to perform an additional example method described above.

A further additional example method in accordance with some embodiments may include: determining an orientation between a first virtual reality (VR) device and one or more remote VR devices; selecting one of the one or more remote VR devices as a second VR device; determining a distance between the first VR device and the second VR device; selecting a first experience-sharing level based on the distance and the orientation; retrieving a first set of content based on the first experience-sharing level; and displaying the first set of content on a display of the first VR device;

For some embodiments of a further additional example method, the orientation between the first VR device and the second device may indicate that the first VR device is oriented towards the second device.

Some embodiments of a further additional example method may further include: determining a change in the distance between the first VR device and the second VR device; selecting a second experience-sharing level based on the changed distance; retrieving a second set of content based on the second experience-sharing level; and displaying the second set of content on the display of the first VR device.

A further additional example apparatus in accordance with some embodiments may include: a processor; and a non-transitory computer-readable medium storing instructions that are operative, when executed by the processor, to perform a method listed above.

Another additional example method in accordance with some embodiments may include: determining a current value relating to both a local virtual reality (VR) device and a remote VR device connected to the local VR device; determining a first experience-sharing level based on a first determined current value, wherein the first experience-sharing mode may include first rules for sharing at least one of content and VR environment information between the local VR device and at least the remote VR device; providing a first shared immersive VR experience to a user of the local VR device, in accordance with the first rules for sharing, and based on a first received set of content relating to an already existing current VR experience session of a user of the remote VR device; determining that the current value relating to both the local VR device and the remote VR device has changed; determining a second experience-sharing mode based on the changed current value, wherein the second experience-sharing mode may include second rules for sharing at least one of content and VR environment information between the local VR device and at least the remote VR device; and providing a second shared immersive VR experience to the user of the local VR device, in accordance with the second rules for sharing, and based on a second received set of content relating to the already existing current VR experience session of the user of the remote VR device.

For some embodiments of another additional example method, the current value relating to both the local VR device and the remote VR device may include at least one of: a current distance between the local VR device and the remote VR device, a tracked value corresponding to a current recognized gesture of the user at the local VR device, a current location of the remote VR device, a tracked gaze of the user at the remote VR device, or a current orientation of the local VR device with respect to the remote VR device.

For some embodiments of another additional example method, providing the first shared immersive VR experience to the user of the local VR device may include displaying the first received set of content at a display of the local VR device.

Some embodiments of another additional example method may further include establishing the connection between the local VR device and the remote VR device.

Another additional example apparatus in accordance with some embodiments may include: a processor; and a non-transitory computer-readable medium storing instructions that are operative, when executed by the processor, to perform a method listed above.

Another further additional example apparatus in accordance with some embodiments may include: a proximity sensor; a processor; and a non-transitory computer-readable medium storing instructions that are operative, when executed by the processor, to perform a method listed above.

Some embodiments of another further additional example method may further include: an HMD direction sensor; and a camera.

BRIEF DESCRIPTION OF THE DRAWINGS

FIG. 1B is a system diagram of an example system illustrating an example wireless transmit/receive unit (WTRU) that may be used within the communications system illustrated in FIG. 1A according to some embodiments.

FIGS. 7A-7F are schematic illustrations indicating a few example modes for displaying chaining information for a chained viewer and for a primary HMD viewer according to some embodiments.

FIG. 13 is a flowchart illustrating an example process for displaying content that is retrieved based on an experience-sharing level set via gesturing according to some embodiments.

The entities, connections, arrangements, and the like that are depicted in—and described in connection with—the various figures are presented by way of example and not by way of limitation. As such, any and all statements or other indications as to what a particular figure "depicts," what a particular element or entity in a particular figure "is" or "has," and any and all similar statements—that may in isolation and out of context be read as absolute and therefore limiting—may only properly be read as being constructively preceded by a clause such as "In at least one embodiment, . . . ." For brevity and clarity of presentation, this implied leading clause is not repeated ad nauseum in the detailed description.

Example Networks for Implementation of the Embodiments

A wireless transmit/receive unit (WTRU) may be used as a head mounted display (HMD), a virtual reality (VR) device, or an augmented reality (AR) device in embodiments described herein.

Figure 1A:
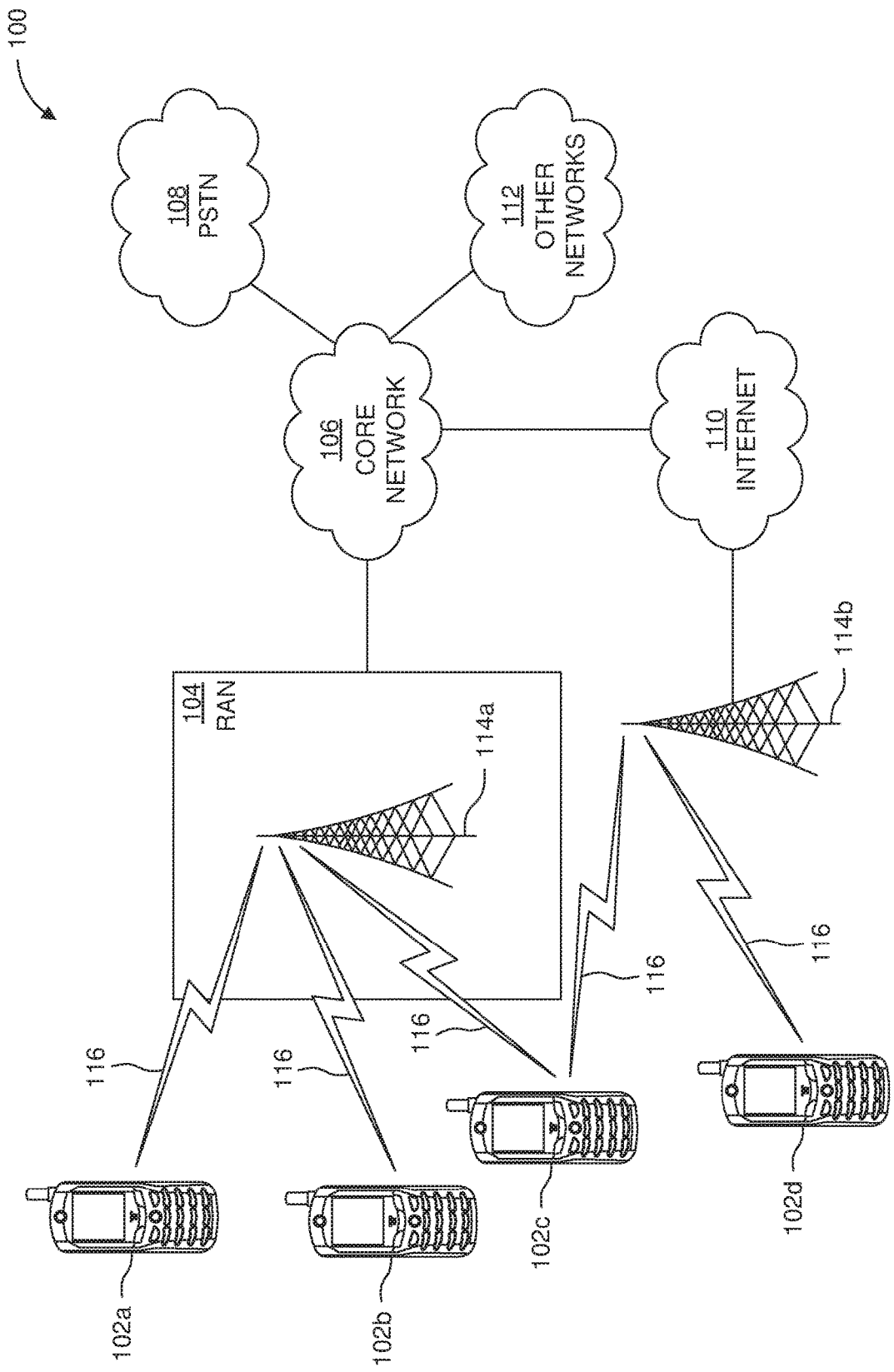
FIG. 1A is a system diagram of an example system illustrating an example communications system according to some embodiments.

FIG. 1A is a diagram illustrating an example communications system 100 in which one or more disclosed embodiments may be implemented. The communications system 100 may be a multiple access system that provides content, such as voice, data, video, messaging, broadcast, etc., to multiple wireless users. The communications system 100 may enable multiple wireless users to access such content through the sharing of system resources, including wireless bandwidth. For example, the communications systems 100 may employ one or more channel access methods, such as code division multiple access (CDMA), time division multiple access (TDMA), frequency division multiple access (FDMA), orthogonal FDMA (OFDMA), single-carrier FDMA (SC-FDMA), zero-tail unique-word DFT-Spread OFDM (ZT UW DTS-s OFDM), unique word OFDM (UW-OFDM), resource block-filtered OFDM, filter bank multicarrier (FBMC), and the like.

As shown in FIG. 1A, the communications system 100 may include wireless transmit/receive units (WTRUs) 102a, 102b, 102c, 102d, a RAN 104/113, a CN 106/115, a public switched telephone network (PSTN) 108, the Internet 110, and other networks 112, though it will be appreciated that the disclosed embodiments contemplate any number of WTRUs, base stations, networks, and/or network elements. Each of the WTRUs 102a, 102b, 102c, 102d may be any type of device configured to operate and/or communicate in a wireless environment. By way of example, the WTRUs 102a, 102b, 102c, 102d, any of which may be referred to as a "station" and/or a "STA", may be configured to transmit and/or receive wireless signals and may include a user equipment (UE), a mobile station, a fixed or mobile subscriber unit, a subscription-based unit, a pager, a cellular telephone, a personal digital assistant (PDA), a smartphone, a laptop, a netbook, a personal computer, a wireless sensor, a hotspot or Mi-Fi device, an Internet of Things (IoT) device, a watch or other wearable, a head-mounted display (HMD), a vehicle, a drone, a medical device and applications (e.g., remote surgery), an industrial device and applications (e.g., a robot and/or other wireless devices operating in an industrial and/or an automated processing chain contexts), a consumer electronics device, a device operating on commercial and/or industrial wireless networks, and the like. Any of the WTRUs 102a, 102b, 102c and 102d may be interchangeably referred to as a UE.

The communications system 100 may also include a base station 114a and/or a base station 114b. Each of the base stations 114a, 114b may be any type of device configured to wirelessly interface with at least one of the WTRUs 102a, 102b, 102c, 102d to facilitate access to one or more communication networks, such as the CN 106/115, the Internet 110, and/or the other networks 112. By way of example, the base stations 114a, 114b may be a base transceiver station (BTS), a Node-B, an eNode B, a Home Node B, a Home eNode B, a gNB, a NR NodeB, a site controller, an access point (AP), a wireless router, and the like. While the base stations 114a, 114b are each depicted as a single element, it will be appreciated that the base stations 114a, 114b may include any number of interconnected base stations and/or network elements.

The base station 114a may be part of the RAN 104/113, which may also include other base stations and/or network elements (not shown), such as a base station controller (BSC), a radio network controller (RNC), relay nodes, etc. The base station 114a and/or the base station 114b may be configured to transmit and/or receive wireless signals on one or more carrier frequencies, which may be referred to as a cell (not shown). These frequencies may be in licensed spectrum, unlicensed spectrum, or a combination of licensed and unlicensed spectrum. A cell may provide coverage for a wireless service to a specific geographical area that may be relatively fixed or that may change over time. The cell may further be divided into cell sectors. For example, the cell associated with the base station 114a may be divided into three sectors. Thus, in one embodiment, the base station 114a may include three transceivers, i.e., one for each sector of the cell. In an embodiment, the base station 114a may employ multiple-input multiple output (MIMO) technology and may utilize multiple transceivers for each sector of the cell. For example, beamforming may be used to transmit and/or receive signals in desired spatial directions.

The base stations 114a, 114b may communicate with one or more of the WTRUs 102a, 102b, 102c, 102d over an air interface 116, which may be any suitable wireless communication link (e.g., radio frequency (RF), microwave, centimeter wave, micrometer wave, infrared (IR), ultraviolet (UV), visible light, etc.). The air interface 116 may be established using any suitable radio access technology (RAT).

More specifically, as noted above, the communications system 100 may be a multiple access system and may employ one or more channel access schemes, such as CDMA, TDMA, FDMA, OFDMA, SC-FDMA, and the like. For example, the base station 114a in the RAN 104/113 and the WTRUs 102a, 102b, 102c may implement a radio technology such as Universal Mobile Telecommunications System (UMTS) Terrestrial Radio Access (UTRA), which may establish the air interface 115/116/117 using wideband CDMA (WCDMA). WCDMA may include communication protocols such as High-Speed Packet Access (HSPA) and/or Evolved HSPA (HSPA+). HSPA may include High-Speed Downlink (DL) Packet Access (HSDPA) and/or High-Speed UL Packet Access (HSUPA).

In an embodiment, the base station 114a and the WTRUs 102a, 102b, 102c may implement a radio technology such as Evolved UMTS Terrestrial Radio Access (E-UTRA), which may establish the air interface 116 using Long Term Evolution (LTE) and/or LTE-Advanced (LTE-A) and/or LTE-Advanced Pro (LTE-A Pro).

In an embodiment, the base station 114a and the WTRUs 102a, 102b, 102c may implement a radio technology such as NR Radio Access, which may establish the air interface 116 using New Radio (NR).

In an embodiment, the base station 114a and the WTRUs 102a, 102b, 102c may implement multiple radio access technologies. For example, the base station 114a and the WTRUs 102a, 102b, 102c may implement LTE radio access and NR radio access together, for instance using dual connectivity (DC) principles. Thus, the air interface utilized by WTRUs 102a, 102b, 102c may be characterized by multiple types of radio access technologies and/or transmissions sent to/from multiple types of base stations (e.g., a eNB and a gNB).

In other embodiments, the base station 114a and the WTRUs 102a, 102b, 102c may implement radio technologies such as IEEE 802.11 (i.e., Wireless Fidelity (WiFi), IEEE 802.16 (i.e., Worldwide Interoperability for Microwave Access (WiMAX)), CDMA2000, CDMA2000 1x, CDMA2000 EV-DO, Interim Standard 2000 (IS-2000), Interim Standard 95 (IS-95), Interim Standard 856 (IS-856), Global System for Mobile communications (GSM), Enhanced Data rates for GSM Evolution (EDGE), GSM EDGE (GERAN), and the like.

The base station 114b in FIG. 1A may be a wireless router, Home Node B, Home eNode B, or access point, for example, and may utilize any suitable RAT for facilitating wireless connectivity in a localized area, such as a place of business, a home, a vehicle, a campus, an industrial facility, an air corridor (e.g., for use by drones), a roadway, and the like. In one embodiment, the base station 114b and the WTRUs 102c, 102d may implement a radio technology such as IEEE 802.11 to establish a wireless local area network (WLAN). In an embodiment, the base station 114b and the WTRUs 102c, 102d may implement a radio technology such as IEEE 802.15 to establish a wireless personal area network (WPAN). In yet another embodiment, the base station 114b and the WTRUs 102c, 102d may utilize a cellular-based RAT (e.g., WCDMA, CDMA2000, GSM, LTE, LTE-A, LTE-A Pro, NR etc.) to establish a picocell or femtocell. As shown in FIG. 1A, the base station 114b may have a direct connection to the Internet 110. Thus, the base station 114b may not be required to access the Internet 110 via the CN 106/115.

The RAN 104/113 may be in communication with the CN 106/115, which may be any type of network configured to provide voice, data, applications, and/or voice over internet protocol (VoIP) services to one or more of the WTRUs 102a, 102b, 102c, 102d. The data may have varying quality of service (QoS) requirements, such as differing throughput requirements, latency requirements, error tolerance requirements, reliability requirements, data throughput requirements, mobility requirements, and the like. The CN 106/115 may provide call control, billing services, mobile location-based services, pre-paid calling, Internet connectivity, video distribution, etc., and/or perform high-level security functions, such as user authentication. Although not shown in FIG. 1A, it will be appreciated that the RAN 104/113 and/or the CN 106/115 may be in direct or indirect communication with other RANs that employ the same RAT as the RAN 104/113 or a different RAT. For example, in addition to being connected to the RAN 104/113, which may be utilizing a NR radio technology, the CN 106/115 may also be in communication with another RAN (not shown) employing a GSM, UMTS, CDMA 2000, WiMAX, E-UTRA, or WiFi radio technology.

The CN 106/115 may also serve as a gateway for the WTRUs 102a, 102b, 102c, 102d to access the PSTN 108, the Internet 110, and/or the other networks 112. The PSTN 108 may include circuit-switched telephone networks that provide plain old telephone service (POTS). The Internet 110 may include a global system of interconnected computer networks and devices that use common communication protocols, such as the transmission control protocol (TCP), user datagram protocol (UDP) and/or the internet protocol (IP) in the TCP/IP internet protocol suite. The networks 112 may include wired and/or wireless communications networks owned and/or operated by other service providers. For example, the networks 112 may include another CN connected to one or more RANs, which may employ the same RAT as the RAN 104/113 or a different RAT.

Some or all of the WTRUs 102a, 102b, 102c, 102d in the communications system 100 may include multi-mode capabilities (e.g., the WTRUs 102a, 102b, 102c, 102d may include multiple transceivers for communicating with different wireless networks over different wireless links). For example, the WTRU 102c shown in FIG. 1A may be configured to communicate with the base station 114a, which may employ a cellular-based radio technology, and with the base station 114b, which may employ an IEEE 802 radio technology.

FIG. 1B is a system diagram illustrating an example WTRU 102. As shown in FIG. 1B, the WTRU 102 may include a processor 118, a transceiver 120, a transmit/receive element 122, a speaker/microphone 124, a keypad 126, a display/touchpad 128, non-removable memory 130, removable memory 132, a power source 134, a global positioning system (GPS) chipset 136, and/or other peripherals 138, among others. It will be appreciated that the WTRU 102 may include any sub-combination of the foregoing elements while remaining consistent with an embodiment.

The processor 118 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), a state machine, and the like. The processor 118 may perform signal coding, data processing, power control, input/output processing, and/or any other functionality that enables the WTRU 102 to operate in a wireless environment. The processor 118 may be coupled to the transceiver 120, which may be coupled to the transmit/receive element 122. While FIG. 1B depicts the processor 118 and the transceiver 120 as separate components, it will be appreciated that the processor 118 and the transceiver 120 may be integrated together in an electronic package or chip.

The transmit/receive element 122 may be configured to transmit signals to, or receive signals from, a base station (e.g., the base station 114a) over the air interface 116. For example, in one embodiment, the transmit/receive element 122 may be an antenna configured to transmit and/or receive RF signals. In an embodiment, the transmit/receive element 122 may be an emitter/detector configured to transmit and/or receive IR, UV, or visible light signals, for example. In yet another embodiment, the transmit/receive element 122 may be configured to transmit and/or receive both RF and light signals. It will be appreciated that the transmit/receive element 122 may be configured to transmit and/or receive any combination of wireless signals.

Although the transmit/receive element 122 is depicted in FIG. 1B as a single element, the WTRU 102 may include any number of transmit/receive elements 122. More specifically, the WTRU 102 may employ MIMO technology. Thus, in one embodiment, the WTRU 102 may include two or more transmit/receive elements 122 (e.g., multiple antennas) for transmitting and receiving wireless signals over the air interface 116.

The transceiver 120 may be configured to modulate the signals that are to be transmitted by the transmit/receive element 122 and to demodulate the signals that are received by the transmit/receive element 122. As noted above, the WTRU 102 may have multi-mode capabilities. Thus, the transceiver 120 may include multiple transceivers for enabling the WTRU 102 to communicate via multiple RATs, such as NR and IEEE 802.11, for example.

The processor 118 of the WTRU 102 may be coupled to, and may receive user input data from, the speaker/microphone 124, the keypad 126, and/or the display/touchpad 128 (e.g., a liquid crystal display (LCD) display unit or organic light-emitting diode (OLED) display unit). The processor 118 may also output user data to the speaker/microphone 124, the keypad 126, and/or the display/touchpad 128. In addition, the processor 118 may access information from, and store data in, any type of suitable memory, such as the non-removable memory 130 and/or the removable memory 132. The non-removable memory 130 may include random-access memory (RAM), read-only memory (ROM), a hard disk, or any other type of memory storage device. The removable memory 132 may include a subscriber identity module (SIM) card, a memory stick, a secure digital (SD) memory card, and the like. In other embodiments, the processor 118 may access information from, and store data in, memory that is not physically located on the WTRU 102, such as on a server or a home computer (not shown).

The processor 118 may receive power from the power source 134, and may be configured to distribute and/or control the power to the other components in the WTRU 102. The power source 134 may be any suitable device for powering the WTRU 102. For example, the power source 134 may include one or more dry cell batteries (e.g., nickel-cadmium (NiCd), nickel-zinc (NiZn), nickel metal hydride (NiMH), lithium-ion (Li-ion), etc.), solar cells, fuel cells, and the like.

The processor 118 may also be coupled to the GPS chipset 136, which may be configured to provide location information (e.g., longitude and latitude) regarding the current location of the WTRU 102. In addition to, or in lieu of, the information from the GPS chipset 136, the WTRU 102 may receive location information over the air interface 116 from a base station (e.g., base stations 114a, 114b) and/or determine its location based on the timing of the signals being received from two or more nearby base stations. It will be appreciated that the WTRU 102 may acquire location information by way of any suitable location-determination method while remaining consistent with an embodiment.

The processor 118 may further be coupled to other peripherals 138, which may include one or more software and/or hardware modules that provide additional features, functionality and/or wired or wireless connectivity. For example, the peripherals 138 may include an accelerometer, an e-compass, a satellite transceiver, a digital camera (for photographs and/or video), a universal serial bus (USB) port, a vibration device, a television transceiver, a hands free headset, a Bluetooth® module, a frequency modulated (FM) radio unit, a digital music player, a media player, a video game player module, an Internet browser, a Virtual Reality and/or Augmented Reality (VR/AR) device, an activity tracker, and the like. The peripherals 138 may include one or more sensors, the sensors may be one or more of a gyroscope, an accelerometer, a hall effect sensor, a magnetometer, an orientation sensor, a proximity sensor, a temperature sensor, a time sensor; a geolocation sensor; an altimeter, a light sensor, a touch sensor, a magnetometer, a barometer, a gesture sensor, a biometric sensor, and/or a humidity sensor.

The WTRU 102 may include a full duplex radio for which transmission and reception of some or all of the signals (e.g., associated with particular subframes for both the UL (e.g., for transmission) and downlink (e.g., for reception) may be concurrent and/or simultaneous. The full duplex radio may include an interference management unit to reduce and or substantially eliminate self-interference via either hardware (e.g., a choke) or signal processing via a processor (e.g., a separate processor (not shown) or via processor 118). In an embodiment, the WRTU 102 may include a half-duplex radio for which transmission and reception of some or all of the signals (e.g., associated with particular subframes for either the UL (e.g., for transmission) or the downlink (e.g., for reception)).

In view of FIGS. 1A-1B, and the corresponding description of FIGS. 1A-1B, one or more, or all, of the functions described herein with regard to one or more of: WTRU 102a-d, Base Station 114a-b, and/or any other device(s) described herein, may be performed by one or more emulation devices (not shown). The emulation devices may be one or more devices configured to emulate one or more, or all, of the functions described herein. For example, the emulation devices may be used to test other devices and/or to simulate network and/or WTRU functions.

The emulation devices may be designed to implement one or more tests of other devices in a lab environment and/or in an operator network environment. For example, the one or more emulation devices may perform the one or more, or all, functions while being fully or partially implemented and/or deployed as part of a wired and/or wireless communication network in order to test other devices within the communication network. The one or more emulation devices may perform the one or more, or all, functions while being temporarily implemented/deployed as part of a wired and/or wireless communication network. The emulation device may be directly coupled to another device for purposes of testing and/or may performing testing using over-the-air wireless communications.

The one or more emulation devices may perform the one or more, including all, functions while not being implemented/deployed as part of a wired and/or wireless communication network. For example, the emulation devices may be utilized in a testing scenario in a testing laboratory and/or a non-deployed (e.g., testing) wired and/or wireless communication network in order to implement testing of one or more components. The one or more emulation devices may be test equipment. Direct RF coupling and/or wireless communications via RF circuitry (e.g., which may include one or more antennas) may be used by the emulation devices to transmit and/or receive data.

DETAILED DESCRIPTION

One question for HMD systems is how to provide synchronized VR experiences for HMD users. For example, a question that may arise when a child watches a children's TV program with an HMD is how may a parent of the child join the watching session. Some embodiments disclosed herein enable HMD users to join VR experiences of other HMD users in a physical environment.

U.S. Pat. No. 8,006,274 ('274), entitled, "Synchronized Media Experience," is understood to disclose enabling a control command entered by a user of one of the remote media entertainment systems to be communicated to each of the two or more remote media entertainment systems. With regard to a synchronized media experience, '274 is understood to disclose generating a group of users and uses a centralized media server and synchronization commands to synchronize representation of media content in the users' devices.

U.S. Pat. No. 9,245,583 ('583), entitled, "Group Control and Messaging for Digital Video Playback Sessions," is understood to disclose enabling users to comment on shared playback using interactive video-based commentary functionality that provides a text channel or graphical images that may be selected from a set of pre-configured commentary items. With regard to shared playback of recorded video content, '583 is understood to disclose creating a user group in which all users are permitted to affect content playback. In addition, '583 is understood to further disclose that users may comment on shared playback using interactive video-based commentary functionality.

However, not only do some users seek fully synchronized VR experiences, users may want to fluently adjust the level of synchronization of VR experiences. For example, in a home environment, a parent may cook dinner in a kitchen and during cooking, the parent wants to use his or her see-through display to monitor content a child is watching in a living room via an HMD device. The parent may walk to the living room and want to join his or her child's VR experience. When dinner is ready, the parent may want to pause playback of VR content in the child's HMD and inform the child that dinner is ready.

How may physical proximity of users and gestures be used in chaining of VR experiences? HMD users may want to adjust the level of synchronization of VR experiences in a virtual environment. For example, users may want to join a fully synchronized VR experience by walking near a user using VR content. Furthermore, a user may want to use gestures to adjust the synchronization-level of VR experiences and to control playback of VR contents in other HMD devices.

Figure 2:
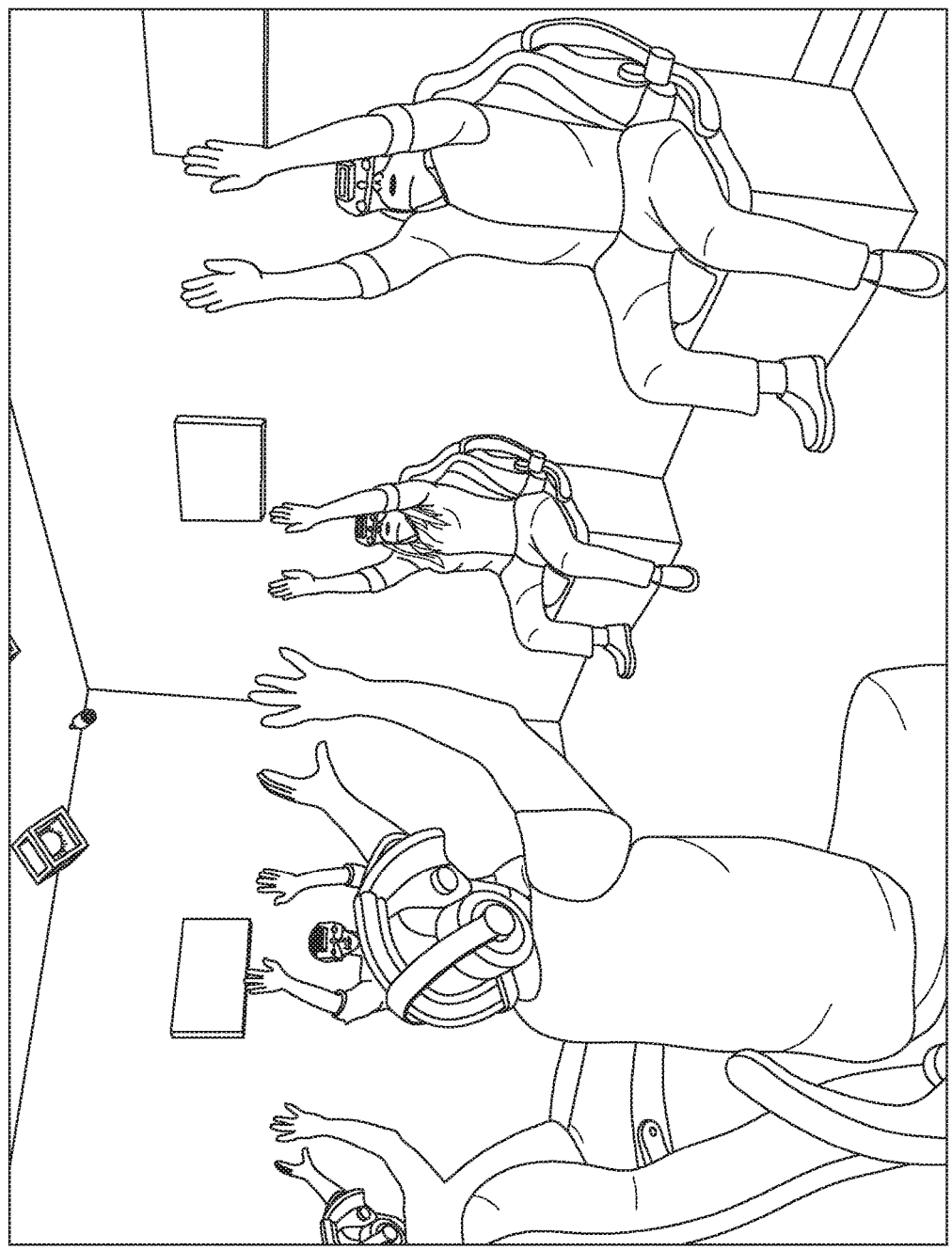
FIG. 2 is an illustration showing an example of multiple HMD VR users in a common room according to some embodiments.

FIG. 2 is an illustration showing an example of multiple HMD VR users in a common room according to some embodiments. The users in the picture 200 are all wearing HMD devices and interacting with VR content.

Figure 3:
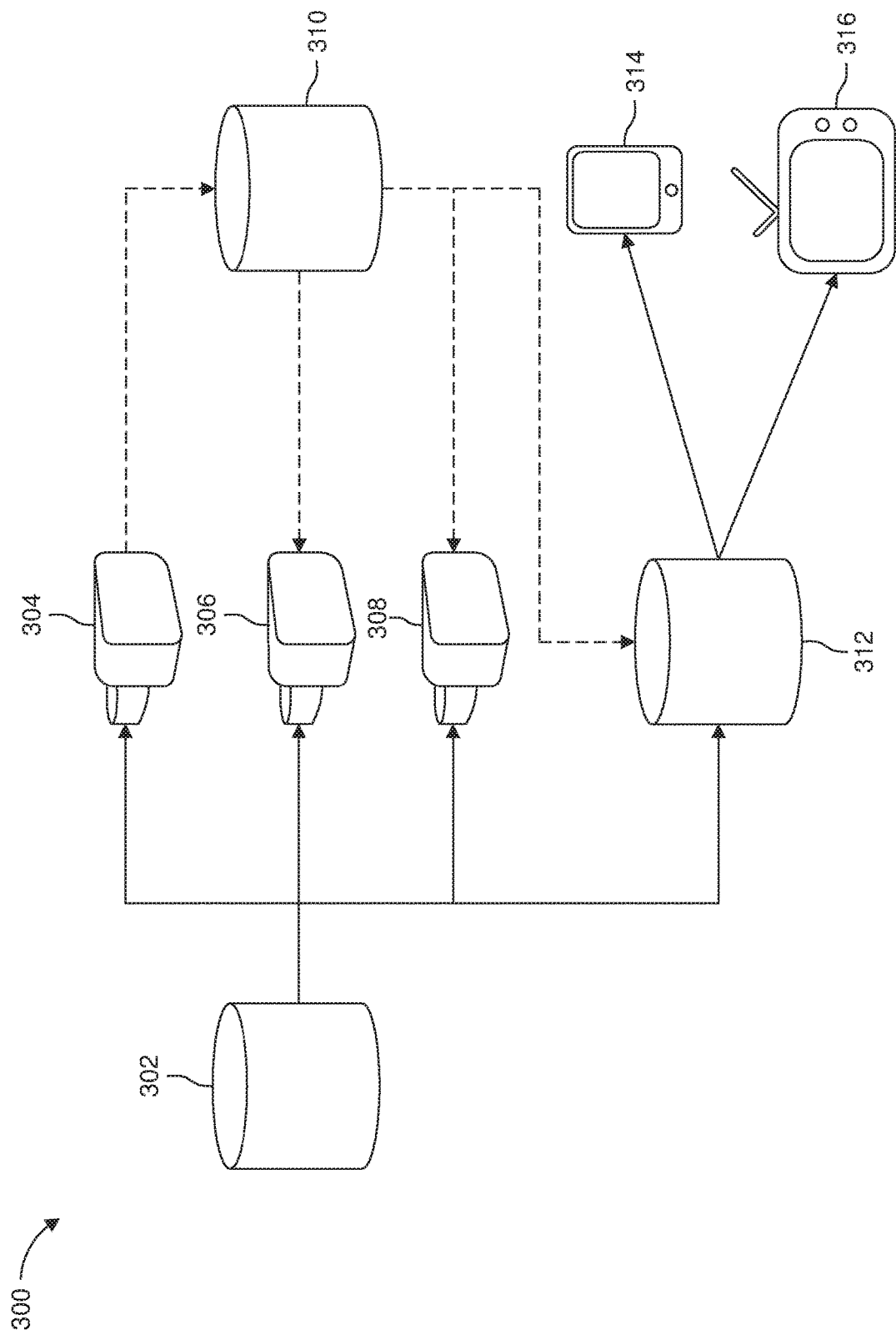
FIG. 3 is a system diagram illustrating an example set of interfaces for connected VR experiences according to some embodiments.

FIG. 3 is a system diagram illustrating an example set of interfaces for connected VR experiences according to some embodiments. For some embodiments of a VR system 300, a content server 302 may store immersive video (e.g., a 360-degree immersive video) content that may be broadcast or multicast, for example, to a master HMD 304, slave HMDs 306, 308, and an edge/cloud server 312. HMD devices may include, for example, a master HMD 304 and two slave HMDs ("slave #1" 306 and "slave #2" 308). A master HMD 304 may send viewport data to a shared virtual environment server (SVES) 310, which may communicate the master HMD's viewport data to slave HMDs and an edge/cloud server. Additional devices (such as a slave mobile device ("slave #3") 314 and a slave television ("slave #4") 316) may receive immersive (or 360-degree) video content and/or viewport data from an edge/cloud server.

Figure 4:
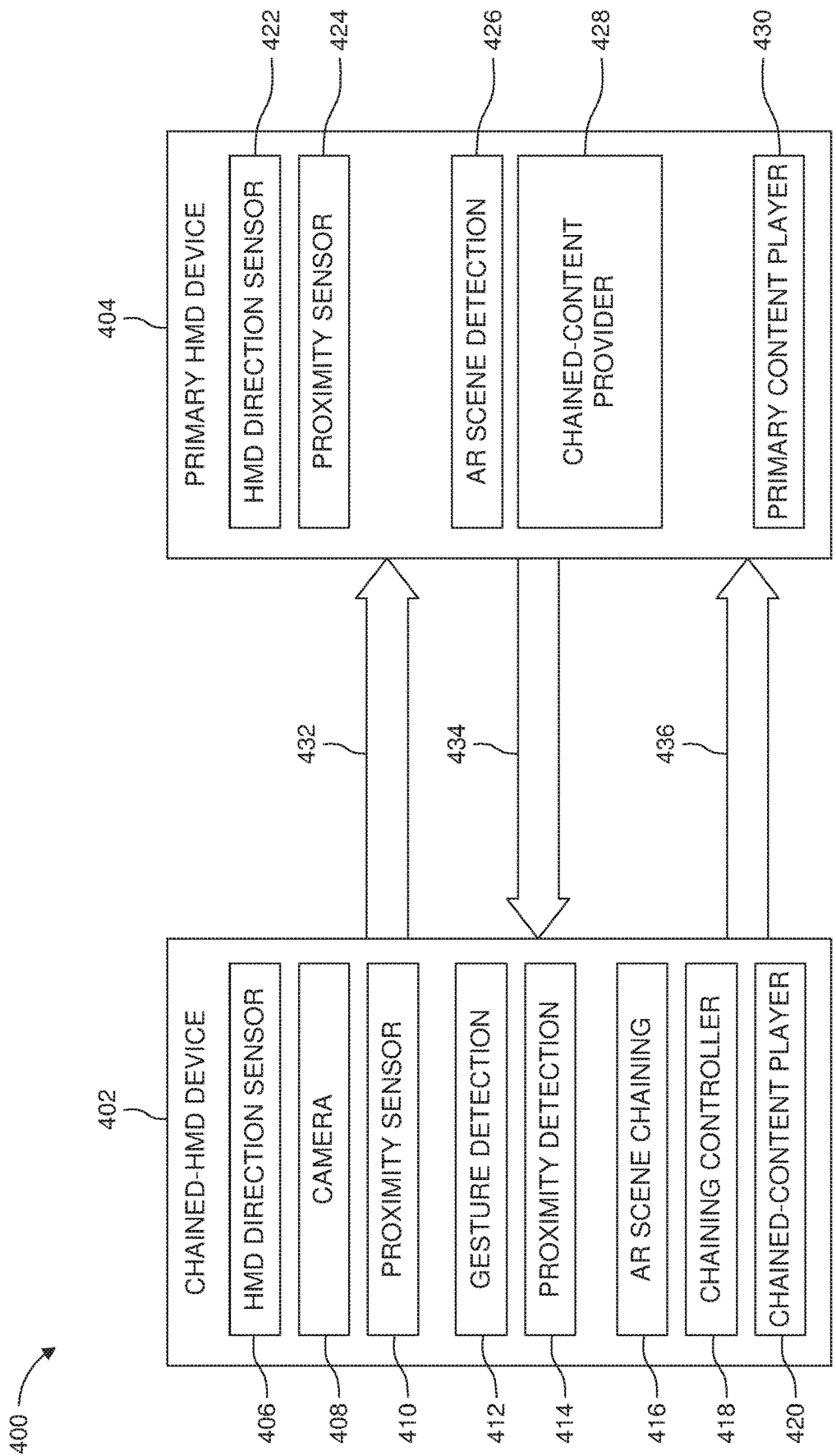
FIG. 4 is a system diagram illustrating an example set of interfaces between chained-HMD devices and primary HMD devices according to some embodiments.

FIG. 4 is a system diagram illustrating an example set of interfaces between chained-HMD devices and primary HMD devices according to some embodiments. An example process for an example primary-chained HMD environment 400 may enable adaptive chaining of VR experiences based on physical proximity and gestures of HMD users and output of chaining information for a primary HMD device 404 and a chained-HMD device 402.

In some embodiments, there may be two kinds of viewers for VR experiences, e.g., primary viewer(s) and chained viewer(s). A primary viewer, for example, is a viewer that selects the content and initiates the content playback in his/her HMD device. A chained viewer, for example, is a viewer having an HMD device that is chained to follow the content playback in the HMD device of the primary viewer. For example, the chained viewer may use the chained HMD device for parental monitoring, e.g., for ensuring that a child (who, in this example, may be a primary viewer) does not see harmful content that may be displayed on his or her HMD.

In some embodiments, an example chained-HMD device may be configured to connect to one or more wired or wireless networks, e.g., the Internet. In some embodiments, the example chained HMD device may include one or more outputs, one or more modules, and/or one or more sensors. In some embodiments, one or more outputs may include a display. The display may be used, e.g., in the output of chained content for the user. In some embodiments, the one or more modules may include one or more software modules. The modules described in FIG. 4 with respect to the example chained HMD device 402 and example capabilities attributed to same are merely examples and many other example module arrangements and example capabilities are possible.

In some embodiments, the example chained-HMD device 402 may include, e.g., an HMD direction sensor 406, a camera 408, and a proximity sensor 410. In some embodiments, the HMD direction sensor 406 may be, e.g., a sensor (such as an Inertial Measurement Unit (IMU)) in an HMD device that is used in head tracking and is capable of producing rotation and translation values for head movements. In some embodiments, the camera 408 may be configured, e.g., to capture a video feed of the gaze direction of the user in a room. In some embodiments, the proximity sensor 410 may be used in estimation of the physical distance between the example primary HMD device 404 and the example chained HMD device 402. For example, a Bluetooth technology may be used in proximity sensing, e.g., as the Bluetooth technology may provide a received signal strength indicator (RSSI) that may be used in rough-level estimation of the distance between the example primary HMD device 404 and the example chained HMD device 402.

In some embodiments, the example chained-HMD device 402 may include a gesture detection module 412, e.g., that may be capable of detecting gestures, e.g., from a captured video feed. In some embodiments, the example chained-HMD device 402 may include a proximity detection module 414, e.g., that uses available sensor information (e.g., a video feed) and estimates the distance between the example chained-HMD device 402 (and/or a user of the example chained HMD device) and the example primary HMD device 404 (and/or a user of the example primary HMD device). For some embodiments, the distance may be determined periodically. For some embodiments, an experience-sharing level may be updated in the distance changes. For some embodiments, an experience-sharing level may include rules for sharing at least one of audio content, video content, viewport information for viewing content, VR environment information (such as location of one or VR objects within a VR environment), a visual representation of a VR experience at a VR device, and a summary description of a VR experience at a VR device.

In some embodiments, the example chained-HMD device 402 may include an AR scene chaining module 416, e.g., that is capable of representing one or more AR objects of a primary viewer from the perspective of a chained viewer. In some embodiments, the example chained-HMD device 402 may include a chaining controller module 418, e.g., that orchestrates detection of chaining mode and delivery of chaining mode information for the example primary HMD device. In some embodiments, the example chained-HMD device 402 may include a chained-content player module 420, e.g., that is capable of playing the chained VR content for the HMD user.

In some embodiments, the example primary HMD device 402 may be configured to connect to one or more wired or wireless networks, e.g., the Internet. In some embodiments, the example primary HMD device 404 may include one or more outputs, one or more modules, and/or one or more sensors. In some embodiments, one or more outputs may include a display. The display of the primary HMD device may be used, e.g., in the output of content for the user. In some embodiments, the one or more modules may include one or more software modules. The modules described in FIG. 4 with respect to the example primary HMD device 404 and example capabilities attributed to same are merely examples and many other example module arrangements and example capabilities are possible.

For some embodiments of a primary HMD device 404, software modules may include an AR scene detection 426, a chained-content provider 428, and a primary content player 430 that may be a module capable of playing VR content and content related to physical objects for the HMD user. An AR scene detection module 426 may be capable of detecting AR objects in the scene of the primary viewer. A chained-content provider 428 may be a module that is capable of delivering the playback information for other HMD users. A primary content player 430 may be a module capable of playing VR content and content related to physical objects for the HMD user.

In some embodiments, the one or more sensors of the primary HMD device may include an HMD direction sensor 422, a camera, and a proximity sensor 424. In some embodiments, the camera may be configured, e.g., to capture a video feed of the gaze direction (scene) of the user in the room. In some embodiments, the HMD direction sensor 422, may be, e.g., a sensor (e.g. an Inertial Measurement Unit (IMU)) in an HMD device, e.g., that is used in head tracking and is capable of producing rotation and translation values for head movements.

In some embodiments, a proximity sensor 424 of the primary HMD device 404 may be used in estimation of the physical distance between the primary HMD device 404 and the chained-HMD device 402. For example, a Bluetooth technology may be used in proximity sensing as it provides a signal strength indicator (RSSI) that may be used in rough-level estimation of the distance between the primary HMD device 404 and the chained-HMD device 402.

In some embodiments of an interface process, the chained-HMD device 402 may send a chaining request 432 to the primary HMD device 404. The chaining request 432 may include a user identifier. In some embodiments, playback information 434 may be sent by the primary HMD device 404 to the chained-HMD device 402. Playback information 434 may include accepted chaining modes, content description, content type, playback state, synchronized content stream, viewport information stream, AR scene information, and primary viewers activity-level. In some embodiments, the chained-HMD device 402 may send a chaining mode message 436 to the primary HMD device 404. The chaining mode message 426 may include chaining mode, proximity of users, and relative positions of users in the room.

Figure 5:
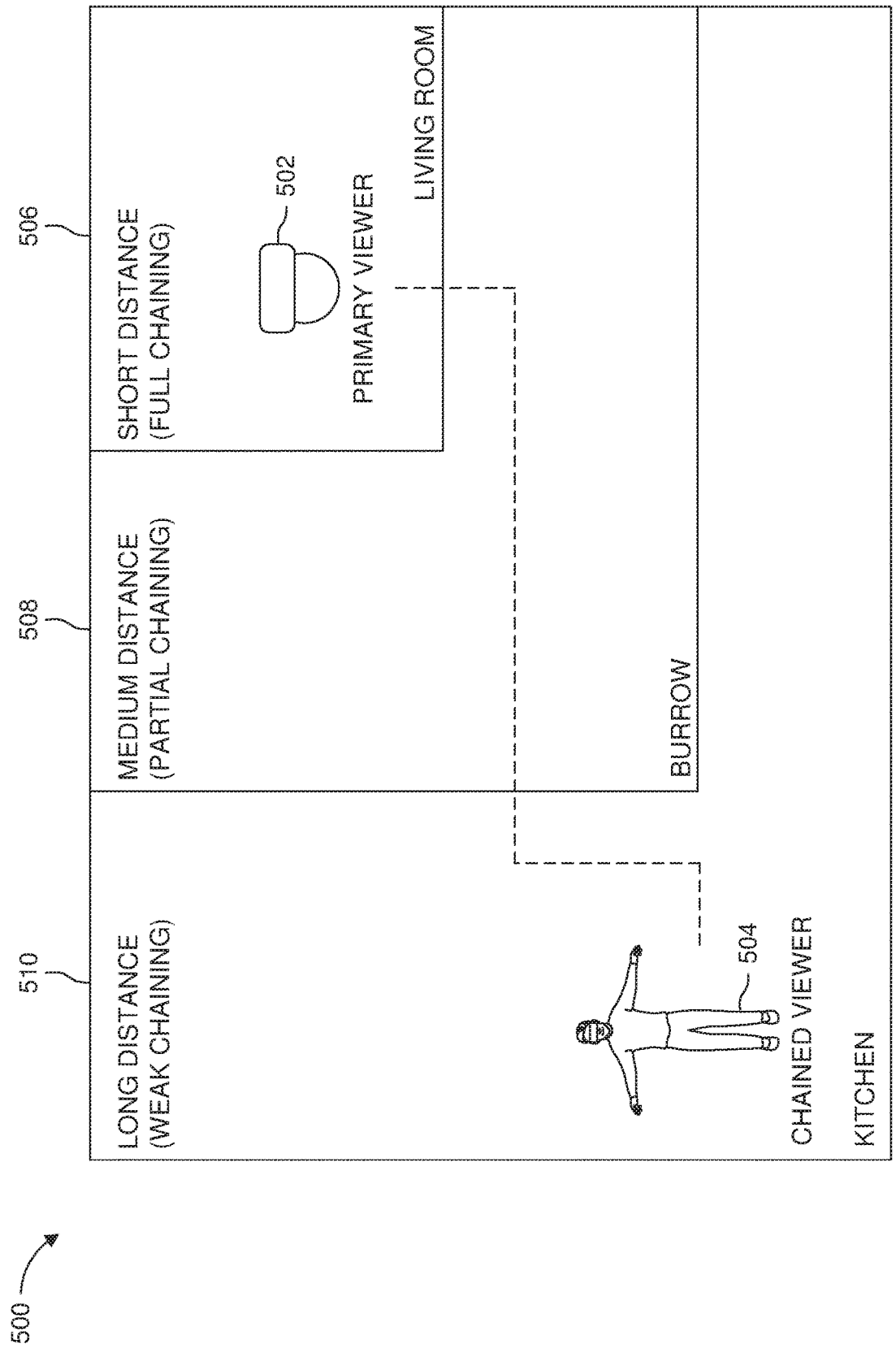
FIG. 5 is a schematic plan view illustrating an example of distance-based chaining modes for different distances according to some embodiments.

FIG. 5 is a schematic plan view illustrating an example of distance-based chaining modes for different distances according to some embodiments. For some embodiments, physical proximity may be used to determine potential options for synchronizing (or chaining) VR experiences. A users voice and a user's gestures may be used to control synchronization (or chaining) of VR experiences. FIG. 5 shows an example of a proximity-triggered chaining between VR/AR devices.

In some embodiments, there may be one or more kinds of chaining modes for VR experiences. For example, a particular chaining mode may be selected and/or may be available to be selected. In some embodiments, a chaining mode is selected from among a plurality of available chaining modes for a physical environment 500 with VR device users. For example, in some embodiments, a weak chaining mode 510, a partial chaining mode 508, and/or a full chaining mode 506 may be available. For example, in some embodiments, one or more subsets of the weak chaining mode 510, the partial chaining mode 508, and/or the full chaining mode 506 may be available. In some embodiments, a weak chaining mode 510 may be associated with a long distance between the primary viewer 502 and the chained viewer 504. In some embodiments, a partial chaining mode 508 may be associated with a medium distance between the primary viewer 502 and the chained viewer 504. In some embodiments, a full chaining mode 506 may be associated with a short distance between the primary viewer 502 and the chained viewer 504.

In some embodiments, one or more weak chaining modes 510 may be available. For example, in some embodiments, in a weak chaining mode (such as a mode for displaying summary description of the VR experience) 510, a chained VR experience may be, for example, set to the following modes: a state chaining mode and/or an avatar chaining mode. In some embodiments, a state chaining mode may be available. For example, in some embodiments, in a state chaining mode, the chained viewer 504 may monitor a state of content playback in a primary viewers HMD device 502. In some embodiments, an avatar chaining mode may be available. For example, in some embodiments, in an avatar chaining mode, avatars may be used for enabling communication, e.g., live communication, between a primary user 502 and a chained user 504.

In some embodiments, a partial chaining mode 508 may be available. For example, in some embodiments, in a partial chaining mode (such as a mode for displaying a visual representation of the VR experience) 508, a chained VR experience may be set to an unlocked chaining mode. For example, in some embodiments, in a partial chaining mode 508, a chained viewer 504 may receive time synchronized output (e.g., a window) for the content that is displayed for the primary viewer 502. Unlike in the locked chaining mode, in the unlocked chaining mode, the chained viewer's head orientation may be used in output of VR content.

In some embodiments, one or more full chaining modes 506 may be available. For example, in some embodiments, in a full chaining mode (such as a fully immersive mode) 506, the chained VR experience may be set to the following modes: locked chaining mode and/or AR object chaining mode. For some embodiments, with a locked chaining mode, the primary viewer 502 may watch VR content (e.g., a 360-degree video or an immersive video) via his or her HMD. In the locked chaining mode, the chained viewer 504 may receive fully time- and orientation-synchronized output for the content that is displayed in the primary viewers HMD. In addition, the content may be shown for the chained viewer 504 in the same orientation as shown for the primary viewer 502.

For some embodiments, with an AR object chaining mode, the primary viewer 502 may watch AR content via his or her HMD. In AR object chaining mode, the AR content that is displayed for the primary viewer 502 is shared for the chained viewers 504 HMD displaying the content in the AR object chaining view from the perspective appropriate for the shared user's viewpoint. Thus, the AR object chaining mode does not replicate the view of the primary viewer 502 as the locked chaining mode but is used for sharing the AR content that is displayed for the primary viewer 502. Furthermore, the primary viewer 502 may share a subset of AR objects with a chained user 504 rather than just sharing all AR objects. For some embodiments, content displayed on a remote VR device may contain a plurality of VR objects, and content displayed on a local VR device may contain a subset of the plurality of VR objects displayed on the remote VR device.

In some embodiments, physical proximity-based chaining of VR experiences is provided. In some embodiments, a level of chaining of VR experiences may be based on an actual physical distance between a primary viewer 502 and a chained viewer 504. In some embodiments, the tracking of the physical proximity of the primary viewer 502 and the chained viewer 504 may be based on the proximity sensors of the used HMDs, visual estimation and cameras of HMDs, and location services available in the physical space. Distance may be used to identify different levels of proximity. In the presence of walls or other people, a more accurate determination of proximity may be used in addition to physical distance. In some embodiments, physical distance-based chaining of VR experiences may be performed, e.g., for long distances, medium distances, and/or short distances.

In some embodiments, for long distances the chaining mode may be set to a state chaining mode, e.g., that enables the chained viewer 504 to monitor the state of playback of content in the primary viewer's 502 HMD device. In some embodiments, the state chaining mode may, for example, provide information such as what content, application or game the primary HMD user is currently experiencing, an activity state (e.g., playing, watching, paused, stopped, active, or inactive), and in some cases high level summary information may be included (e.g., a current level for a game the primary user is playing, a total time and current playback time for a movie the primary user is watching, or an amount of time the primary user has been engaged in the current virtual experience). In some embodiments, an avatar chaining mode may be additionally or alternatively activated, e.g., if the primary 502 and chained 504 viewers want their avatars to be included to the chained VR experience.

In some embodiments, for medium distances, the chaining mode may be set to an unlocked chaining mode, e.g., that enables the chained viewer 504 to get synchronized output (e.g., a viewport) for at least some of the content that is displayed for the primary viewer 502.

In some embodiments, for short distances, the chaining mode may be set to a full chaining mode. The full chaining mode used may depend on the content displayed in the primary viewer's 502 HMD device. The content used in the primary viewers 502 HMD device may be, e.g., VR content and/or AR content.

In some embodiments, if VR content is to be shared, the chaining mode may be set to a locked chaining mode, e.g., that enables the chained viewer 504 to get full synchronized output for the content that is displayed for the primary viewer 502. In addition, the content may be shown for the chained viewer 504 in the same orientation as shown for the primary viewer 502.

In some embodiments, if AR content is to be shared, the chaining mode may be set to an AR object chaining mode, e.g., that enables the chained viewer 504 to see the AR content that is currently displayed for the primary viewer 502.

For some embodiments, if a large distance separates a first user (e.g., a chained viewer 504) and a second user (e.g., a primary viewer 502), the VR device of the first user may be in a low immersiveness mode (e.g., a weak chaining mode 510), and the VR device of the first user may display a summary description of the VR experience of the VR device of the second user. For example, a summary description may include a textual description of the VR environment of the other VR device.

For some embodiments, if a medium distance separates a first user (e.g., a chained viewer 504) and a second user (e.g., a primary viewer 502), the VR device of the first user may be in a medium immersiveness mode (e.g., a partial chaining mode 508), and the VR device of the first user may display a visual representation of the VR experience of the VR device of the second user. For example, a visual representation may include a window that covers a portion of the VR display environment, and within the window, there may be a miniaturized depiction of the VR environment (or VR experience) of the other VR device.

For some embodiments, if a small distance separates a first user (e.g., a chained viewer 504) and a second user (e.g., a primary viewer 502), the VR device of the first user may be in a high immersiveness mode (e.g., a full chaining mode 506), and the VR device of the first user may display a fully immersive version of the VR experience of the VR device of the second user. For example, a fully immersive mode may display at the first VR device the same VR environment (or VR experience) content displayed at the second VR device. The fully immersive mode may be displayed using the full display area or substantially the full display area of the VR device of the first user.

Figure 6A:
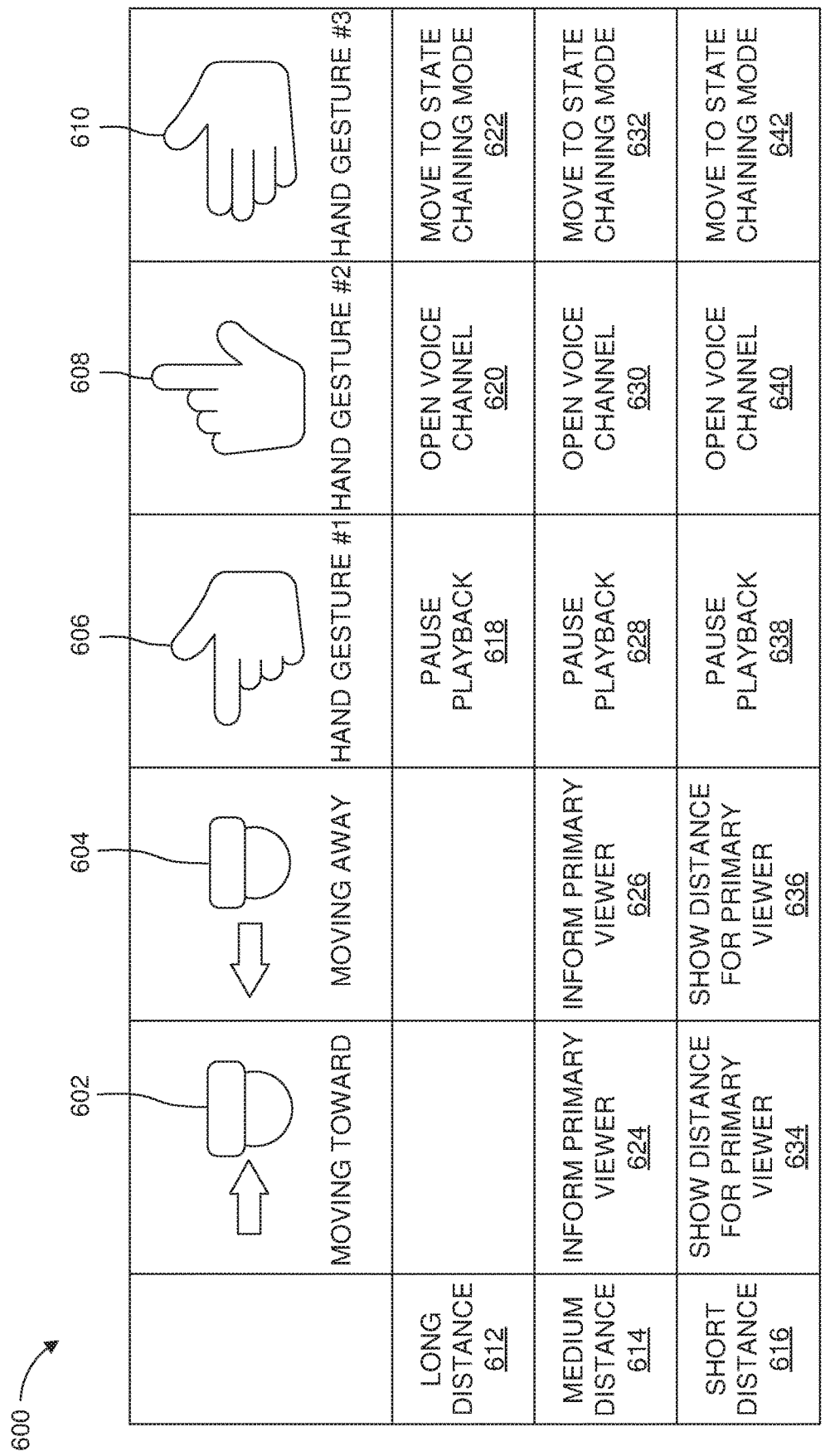
FIGS. 6A and 6B are tables indicating example gestures and movements of a user in chaining of VR experiences according to some embodiments.
Figure 6B:
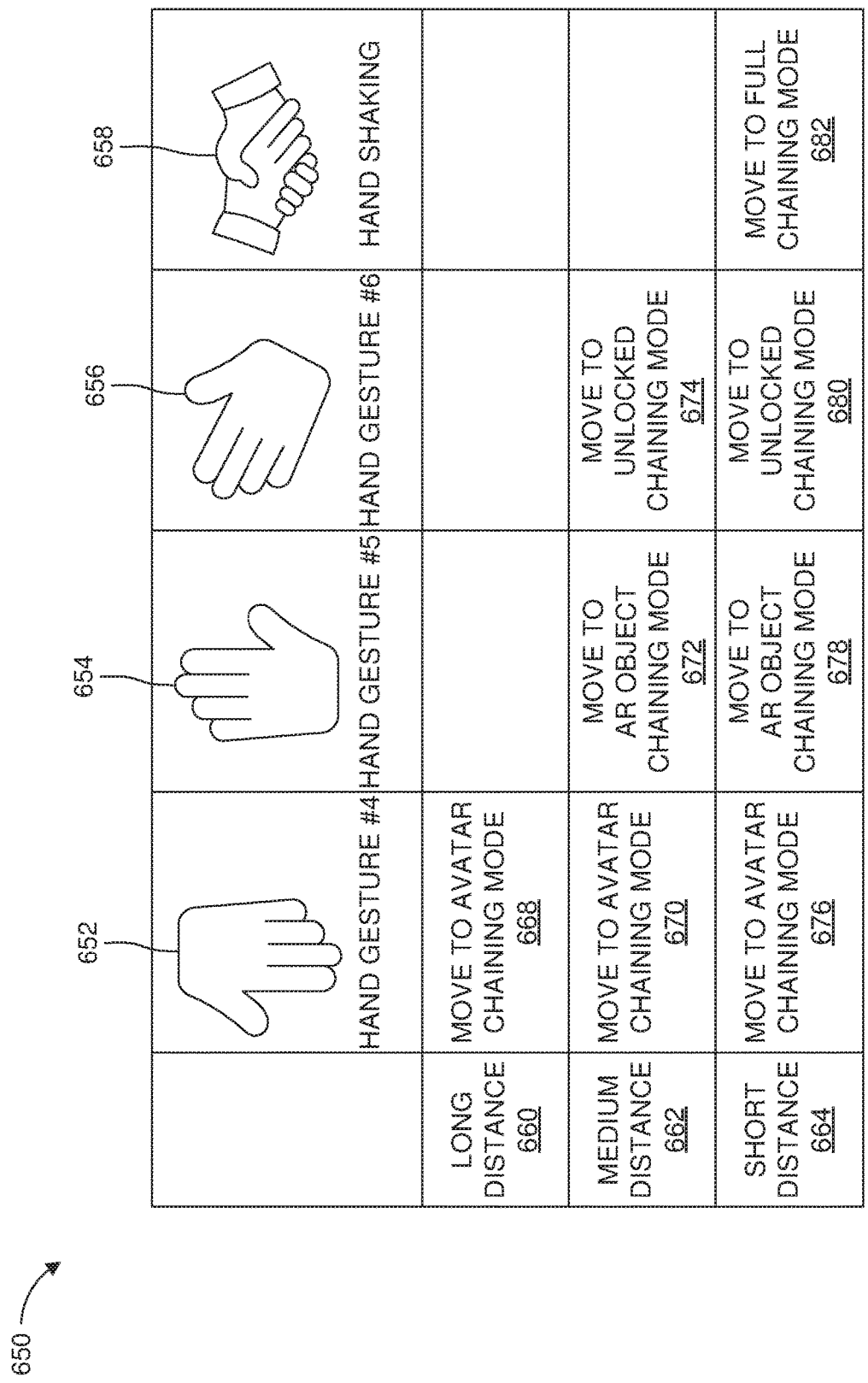

FIGS. 6A and 6B are tables 600, 650 indicating example gestures and movements of a user in chaining of VR experiences according to some embodiments. It should be understood that these gestures 602, 604, 606, 608, 610, 652, 654, 656, 658 and corresponding distances (or movements resulting in such distances) 612, 614, 616, 660, 662, 664 are merely examples and many other arrangements are possible. In some embodiments, gesture-based chaining of VR experiences is provided. The chaining of VR experiences may be based on the distance between the primary viewer and the chained viewer and on gestures/movements of the chained viewer. FIGS. 6A and 6B indicate gestures 602, 604, 606, 608, 610, 652, 654, 656, 658 and distances (or associated movements) 612, 614, 616, 660, 662, 664 of HMD users that may be used in chaining of VR experiences. Gestures of a user may be determined, for example, by a camera on the user's HMD, a smart space, and/or a camera on another user's HMD. If a gesture by someone other than the current user is detected, the gesture may be communicated to the current user so that a response action may be taken. FIGS. 6A and 6B list the following examples of movements and gestures that may be used in controlling chaining of VR experiences: an HMD user moving toward 602 another user, an HMD user moving away 604 from another user, six hand gestures 606, 608, 610, 652, 654,656, and a hand shaking gesture 658. The set of gestures shown in FIGS. 6A and 6B is not exhaustive, and other gestures may also be taken and used to trigger or control the chaining of VR experiences. For example, an HMD user turning toward another HMD user or gazing at the other HMD user may be detected (e.g., using HMD Direction Sensor 406 of HMD device 402, or a camera sensor, or an external localization system), and the orientation of the first HMD relative to the position of the second HMD may be used to initiate a chained experience, or to transition from one level of immersiveness to another For an HMD user moving toward 602 another user, the chained viewer may walk toward the primary viewer. In some embodiments, the primary viewer may be informed 624 about the approaching chained viewer in a case of medium 614 and short 616 distances. The distance between the primary viewer and chained viewer may be displayed 634 for the primary viewer. The gesture 602 may be performed at short 616 and medium 614 distances between the chained viewer and the primary viewer.

For an HMD user moving away 604 from another user, the chained viewer may walk away from the primary viewer. In some embodiments, the primary viewer may be informed 626 about the movement in a case of medium 614 and short 616 distances. The distance between the primary viewer and the chained viewer may be displayed 636 for the primary viewer. The gesture 604 may be performed at short 616 and medium 614 distances between the chained viewer and the primary viewer.

For hand gesture #1 (606), the chained viewer may perform the gesture 606 for pausing 618, 828, 838 the content playback in the HMD device of the primary viewer. The gesture 606 may be performed at short, medium, and long distances between the chained viewer and the primary viewer.

For hand gesture #2 (608), the chained viewer may perform the gesture 608 for opening 620, 630, 640 a voice channel that enables (s)he to talk to the primary viewer. The gesture 608 may be performed at short, medium, and long distances between the chained viewer and the primary viewer.

For hand gesture #3 (610), an HMD user may perform the hand gesture 610 to set 622, 632, 642 the chaining of the VR experience to a state chaining mode. The gesture 610 may be performed at short, medium, and long distances between the chained viewer and the primary viewer.

For hand gesture #4 (652), an HMD user may perform the hand gesture 652 to set 668, 670, 676 the chaining of the VR experience to an avatar chaining mode. The gesture 652 may be performed at short 664, medium 662, and long 660 distances between the chained viewer and the primary viewer.

For hand gesture #5 (654), an HMD user may perform the hand gesture 654 to set 672, 678 the chaining of the VR experience to an AR object chaining mode. The gesture 654 may be performed at short 664 and medium 662 distances between the chained viewer and the primary viewer.

For hand gesture #6 (656), an HMD user may perform the hand gesture 656 to set 674, 680 the chaining of the VR experience to an unlocked chaining mode. The gesture 656 may be performed at short 664 and medium 662 distances between the chained viewer and the primary viewer.

For a hand shaking gesture 658, the chained viewer and the primary viewer may perform a hand shake to set the chaining of the VR experience to a full chaining mode. The full chaining mode used (AR object chaining mode or locked chaining mode) may be selected 682 based on the content displayed in the primary viewer's HMD device. The gesture 658 may be performed at a short distance 664 between the chained viewer and the primary viewer.

For some embodiments, a gesture of a user may be detected, and the viewing configuration or viewing information of a VR display environment may be adjusted based on the detected gesture. Content may be displayed within a VR display environment based on the viewing configuration or viewing information. For some embodiments, the viewing information may include the immersiveness mode, and the detected gesture may be used to select the immersiveness mode or experience-sharing level. For some embodiments, the viewing information include orientation, resolution, viewport, and/or other display parameter. For some embodiments, a VR device may use detected gestures and detected distance between local and remote VR devices to change the immersiveness mode. For some embodiments, a local VR device may track the distance between the local VR device and a remote VR device. The tracked distance may be used to change (or set) the immersiveness mode. For example, tracked distance may divided into 2 or more distance ranges, and the immersiveness mode be set to a particular mode for each distance range (e.g., 0-50 feet may be associated with a high immersiveness mode, 50-100 feet may be associated with a medium immersiveness mode, and greater than 100 feet may be associated with a low immersiveness mode).

FIGS. 7A-7F are schematic illustrations indicating a few example modes for displaying chaining information for a chained viewer and for a primary HMD viewer according to some embodiments. Systems and methods disclosed herein in accordance with some embodiments may provide views for displaying such chaining information. The perspective views 702, 722, 742, 752, 772, 792 on the left side of FIGS. 7A-7F show an example of an AR display environment for a chained viewer, while the perspective views 704, 724, 744, 754, 774 on the right side of FIGS. 7A-7F show an example of an AR display environment for a primary viewer. Note that while the description is for AR, each example alternately may make use of a VR display device for either or both of the primary and chained devices.

Figure 7A:
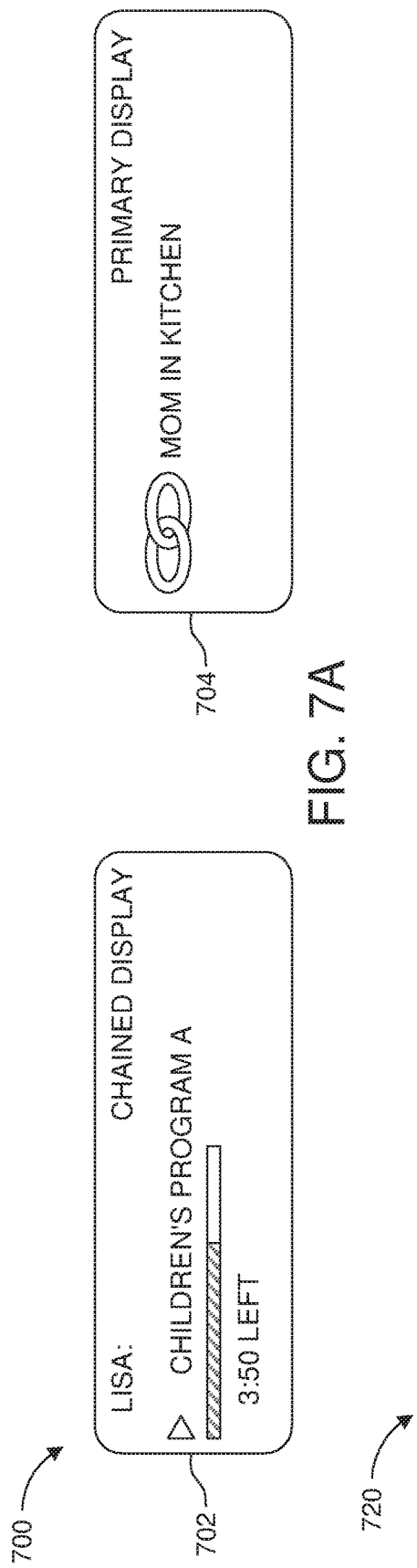

FIG. 7A shows an example 700 of state chaining for state monitoring. The chained viewer AR display environment 702 may display information about the state of content playback on the primary viewer's display. The primary viewer AR display environment 704 may display information (not shown) indicating that the chained user is following the content playback. Although not shown explicitly, the primary viewer AR display environment 704 additionally displays the content (e.g. playback of a children's program) which the primary viewer is experiencing.

Figure 7B:
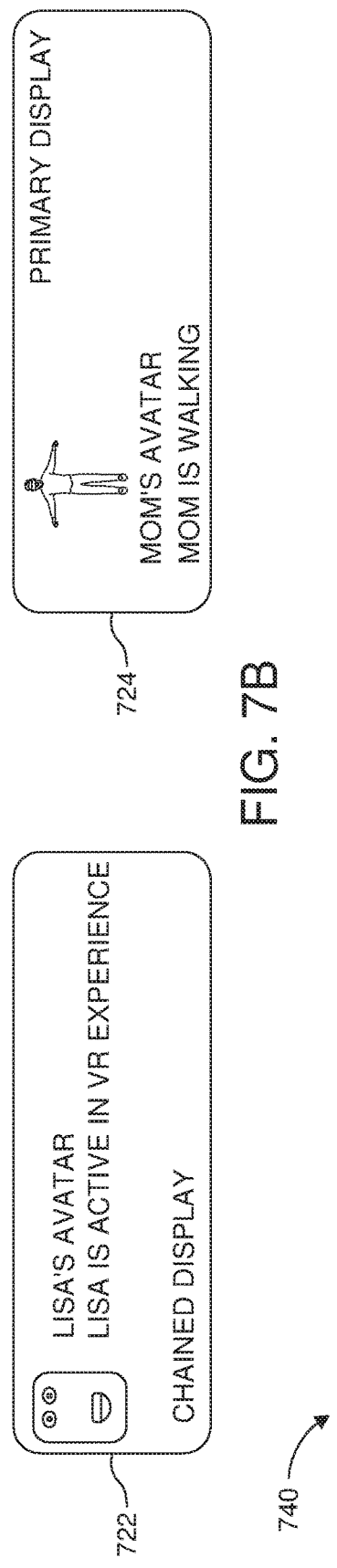

FIG. 7B shows an example 720 of avatar chaining for synchronized content output. In the avatar chaining mode, there are provided views to display the animated avatars in the primary viewers HMD and in the chained viewer's HMD to enable live communication between the primary viewer and chained viewer. The chained viewer AR display environment 722 may display an avatar of the primary user. The primary viewer AR display environment 724 may display an animated avatar of the chained viewer, such as, e.g., a moving avatar indicating that the chained viewer is walking. The avatars may support interaction between users by being capable of illustrating: a users activity, a user's head motion-based communication, a users mount movements, and balloons related to avatars, as discussed below.

Figure 7C:
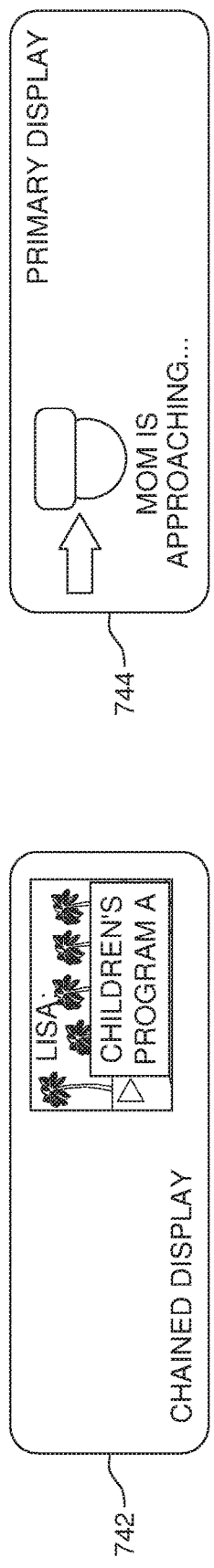

FIG. 7C shows an example 740 of unlocked chaining for synchronized content output. In the unlocked chaining mode, the content (e.g., a 360-degree video) that is displayed for the primary viewer is shared for the chained viewer. The chained viewer AR display environment 742 may display a viewport of time-synchronized content displayed for the primary viewer. The viewport of content shown in chained viewer AR display environment 742 may represent a reduced size or limited field of view version of content being experienced by the primary viewer in primary viewer AR display environment 744. The viewing direction of the primary viewer may not be shared for some embodiments. In addition to displaying the content being experienced by the primary viewer, the primary viewer AR display environment 744 may display a view informing the viewer about the chained user. This view may identify (or indicate) that a chained user is monitoring the primary viewer's session, may identify (or indicate) the chained user (e.g., "Mom"), and may provide information about an activity or proximity of the chained user (e.g., " . . . is approaching").

FIG. 7D shows an example 750 for locked chaining. In the locked chaining mode, the content (e.g., a 360-degree video) displayed for the primary viewer may be shared with the chained viewer. In addition, viewport information about the viewport displaying content for the primary viewer may be delivered for the chained viewer. The chained viewer AR display environment 752 may display content in the same orientation that is shown to the primary viewer. The orientation of the content displayed in the chained viewer AR display environment 752 may be determined based on head movements of the primary viewer, for example. The primary viewer AR display environment 754 may display for the primary viewer the content that is then shared with the chained viewer. An additional assisted unlocked chaining mode may be provided to the chained viewer that enables the chained viewer to change his/her head orientation while watching content and that shows the viewport of the primary user as a rectangle in the assisted unlocked chaining view.

For some embodiments, a local VR device may retrieve viewport information of a remote VR device based on the experience-sharing level (e.g., or mode) or immersiveness mode (e.g., or level), and content may be retrieved based on the combination of the viewport information and the experience-sharing level or immersiveness mode. For example, content may be retrieved by the local VR device using an orientation or viewport of a remote VR device. For some embodiments, a local VR device may retrieve viewing information of a remote VR device based on the experience-sharing level or immersiveness mode, and content may be displayed by the local VR device based on the viewing information. For example, the viewing information may include resolution, orientation, and/or viewport configuration settings of the remote VR device. For some embodiments, a local VR device may detect an orientation of the local VR device, and content to be displayed by the local VR device may be adjusted to correspond to the orientation detected. The adjusted content may be displayed by the local VR device.

FIGS. 7E and 7F show an example for AR object chaining. In the AR object chaining mode, the AR content displayed for the primary viewer may be shared with the chained viewer's HMD, which displays the content in the AR object chaining view. The AR object chaining mode may provide two different perspectives for the AR object: a chained AR perspective and a virtual AR perspective.

FIG. 7E shows an example 770 of a view from a chained AR perspective. Each VR device may enable a user to see an AR object (such as a painting of a flower) on a table. The chained viewer AR display environment 772 may display, e.g., the AR object on the table. The primary viewer AR display environment 774 may display, e.g., the AR object on the table. Without AR object chaining, the other participant may not see the AR object on the table. With chaining, the chained user may see the same AR object on the table from his/her appropriate perspective.

FIG. 7F shows an example 790 of a view from a virtual AR perspective. A virtual AR perspective may be displayed if the AR object is not in the scene of the chained viewer. For example, the AR object may be behind a wall and thus is not visible for the chained viewer. In the virtual AR perspective, a video feed of a physical object (from the camera of primary viewer's HMD) and AR content (e.g., "Painting of flower") may be shared with the chained viewer. The chained viewer AR display environment 792 may display the AR content (e.g., a painting of a flower) and provide a viewport that shows a video feed of a physical object corresponding to the AR content. The primary viewer AR display environment (not shown) may display the AR object on an AR display environment rendering of a real-world table.

Figure 8A:
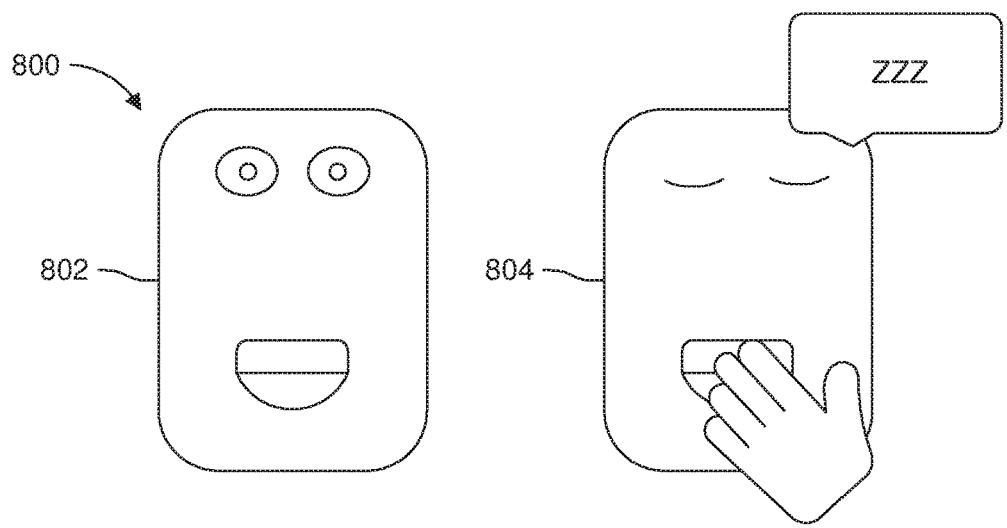
FIGS. 8A-8C are schematic illustrations showing an example set of interactions of avatars of chained HMD users according to some embodiments.
Figure 8B:
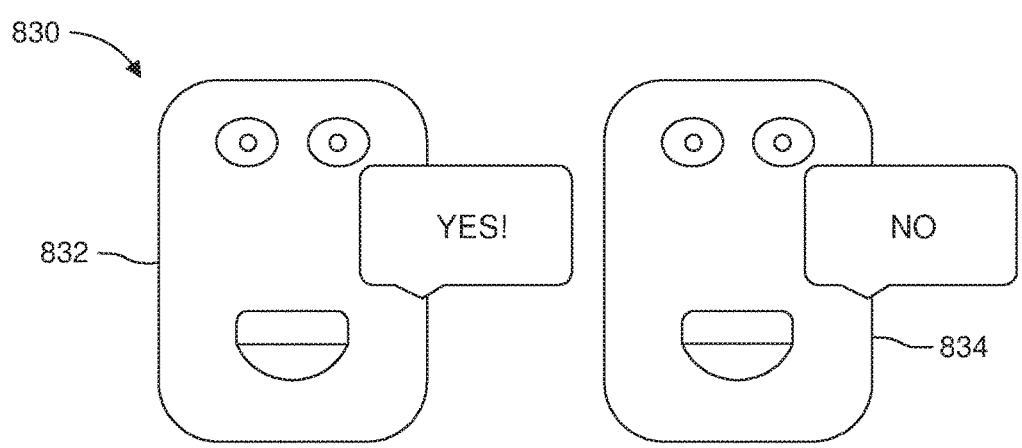
Figure 8C:
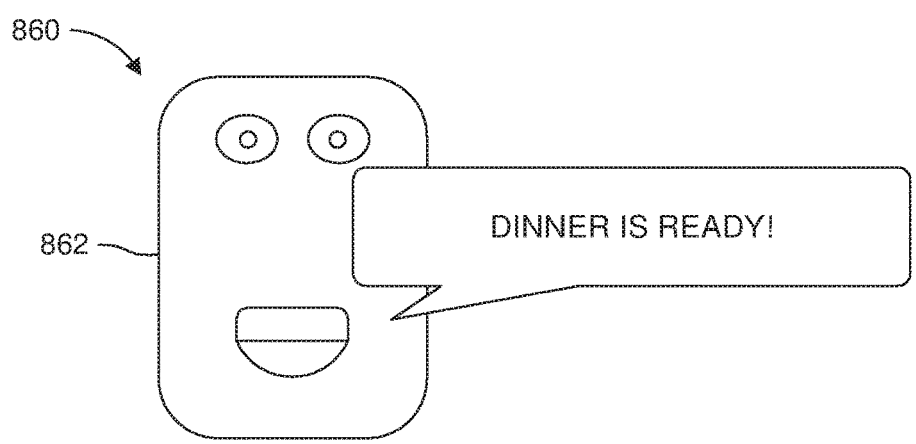

FIGS. 8A-8C are schematic illustrations showing an example set of interactions of avatars of chained HMD users according to some embodiments. For some embodiments, the example system may include an example chained HMD device and an example primary HMD device.

In some embodiments, the head orientation changes and movements of the primary or remote user may be analyzed to detect activity of the primary or remote user. In some embodiments, the head orientation changes and movements of the chained or local user may be analyzed to detect activity of the chained or local user. The detected activity may be presented in an animated avatar illustration for passing information about the activity of the primary user to the chained user (see FIGS. 8A-8C). In addition, textual information about the user's current activity (e.g., "primary viewer is active" or "chained viewer is walking") may be shown in the avatar chaining views.

A chained user may perform a gesture for opening a voice channel to communicate with the primary user. As a result, this enables the primary user and the chained user to talk to each other. FIG. 8A shows an example 800 of a primary user avatar 802 and a chained user avatar 804. The primary user avatar 802 is active and the chained user avatar 804 is passive (e.g., sleeping, as indicated by the avatar text "ZZZ") for this example.

A chained user's head motion may be used for communication. For example, a chained users head turning to up and down may be detected to mean "yes" and a chained user's head turning to left and right may be detected to mean "no". These "yes" and "no" expressions may be illustrated in the visual representation of the user's avatar. FIG. 8B shows an example 830 of a first avatar 832 animated to say "Yes!" and a second avatar 834 animated to say "No". These example avatar expressions may be generated to correspond to user movements, such as nodding and shaking of the head. For some embodiments, a gesture may include a users head motion.

A user's avatar may have, e.g., an animated mouth to represent the speech of the particular user. A VR device (such as an HMD) may have a speech-to-text recognition module to form textual representation for the speech of the primary/chained user. The recognized speech may be represented as balloons that are combined with visual representations of avatars. FIG. 8C shows an example 860 of an avatar 862 animating an example visual command ("Dinner is ready!") that may be spoken by a user of a VR device.

For some embodiments, a voice command may be detected by a VR device, and the voice command may be used to select an experience-sharing level or immersiveness mode. For example, a user may say, "Change immersiveness mode to medium." The voice command may be detected by the VR device, and the immersiveness mode may be set to a medium level. For some embodiments, an avatar associated with a user of a remote device may be displayed at the local device, such as the examples shown in FIGS. 8A and 8B.

Figure 9:
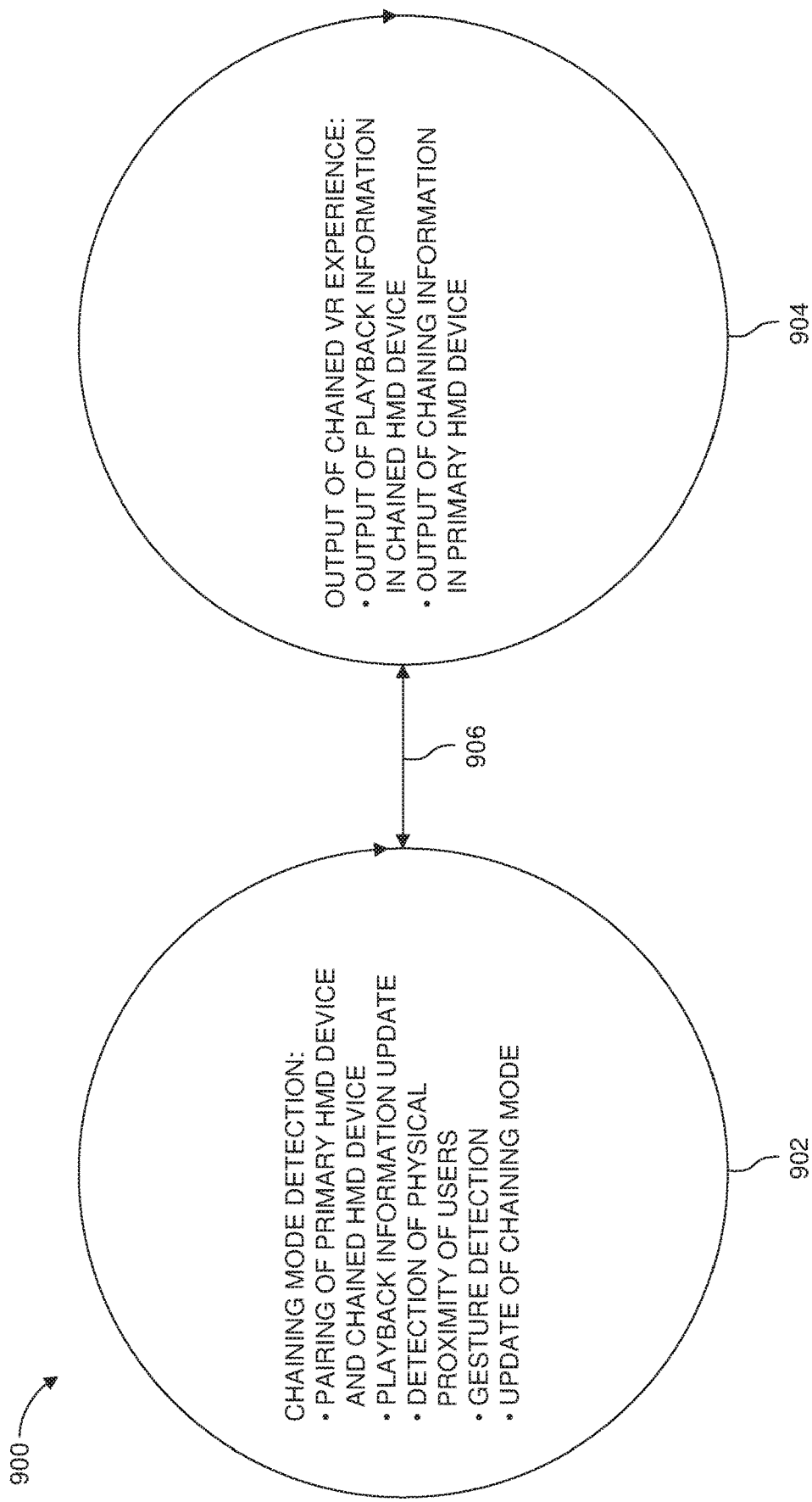
FIG. 9 is a system diagram illustrating an example set of processes for detecting a chaining mode and for outputting a chained VR experience according to some embodiments.

FIG. 9 is a system diagram illustrating an example set of processes for detecting a chaining mode and for outputting a chained VR experience according to some embodiments. The example process 900, for example, may enable continuous (or continual) chaining mode detection 902 of HMDs based on physical proximity and gestures of HMD users and outputting 904 of chaining information for primary HMD users and for chained HMD users. In some embodiments, the example process 900 may include chaining mode detection 902 and output 904 of chained VR experience. In some embodiments, chaining mode detection 902 may include, e.g., pairing of primary HMD device and chained HMD device; playback information update; detection of physical proximity of users; gesture detection; and update of chaining mode. In some embodiments, outputting 904 of chained VR experience may include, e.g., output of playback information in chained HMD device and output of chaining information in primary HMD device. For some embodiments of an example process 900, the chaining mode, playback information in a chained VR device, and chaining information in a primary VR device may be communicated 906 between a chaining mode detection process and a chained VR experience output process.

Some example embodiments may enhance sharing of VR experiences between a user viewing content via an HMD device and other HMD user(s) (e.g., with users that are using see-through goggles). Some example embodiments may enable a chained HMD user to follow playback of content in a primary HMD device. Some example embodiments may enable a chained HMD user to use gestures for controlling chaining of VR experiences. In some embodiments, the chained user may control the content output in the primary device. For example, a parent may stop the playing of a scary program in a child's HMD device. In some embodiments, a primary user may be informed about a chained user that is moving towards the primary user in the room. Some example embodiments enable opening of a communication channel (e.g., a voice channel) between the chained user and the primary user.

In some embodiments, a chaining request may be transmitted. The chaining request message may be used, e.g., in pairing the chained HMD device with the primary HMD device. The message may contain a user identifier field, which is an identifier of a viewer who would like to have a chained VR experience with the primary viewer.

AR scene information may specify content that may be used for providing views for chained AR objects. An AR scene information message may contain, e.g., one or more of the following fields: scene video stream, AR objects stream, AR object identifier, AR object positions, and AR content. A scene video stream may contain a video stream for a scene of a primary viewer. An AR objects stream may contain information about chained AR objects that are visible in the video stream. The AR objects stream may contain, e.g., one or more of the following fields for AR objects: AR object identifier, AR object positions, and AR content. An AR object identifier field may contain an identifier of the AR object. An AR object positions field may contain positions for the AR object in the real-world via markers or scene features. An AR content field may contain AR content (e.g., "Painting of Flower") that is in the primary users HMD.

In some embodiments, playback Information may be updated. A playback information update message may be used in delivery of playback information from the primary HMD device for the chained HMD device. The message may contain the following fields: accepted chaining modes, content description, content type, playback state, synchronized content stream, viewport information stream, AR scene information, and primary viewer's activity-level. An accepted chaining modes field may contain the chaining modes that are accepted to be used in the chained VR experience. The field may contain values such as "State chaining mode", "Avatar chaining mode", "Unlocked chaining mode", "Locked chaining mode", and "AR object chaining mode". A content description field may contain a name and description for the content that is played in the primary HMD device. A content type field may contain the type of content displayed in the primary HMD device. The field may have a value such as "VR content", "360 video", or "AR content". A playback state field may contain a value such as "Playing", "Paused", or "Stopped". A synchronized content stream field may contain the synchronized content stream for content that is currently displayed in the primary HMD device. A viewport information stream field may contain the stream to deliver information about the viewport displaying content for the primary user. A viewport for the chained user may be provided that displays content by using the primary users head orientation. An AR scene information field may contain the stream to deliver information that may be used for providing views for chained AR objects. This field may include both descriptions of the AR content and a description of where the content is located in the real-world via marker or scene features. A primary viewer's activity-level field may contain the current activity of the primary viewer. The field may have a value such as "Still (sleeping)", "Normal", or "Turning around (very active)".

In some embodiments, a chaining mode may be updated. The chaining mode update message may be used to deliver chaining mode information from the chained HMD device to the primary HMD device. The message may contain the following fields: chaining mode, physical proximity of users, and relative position of chained users in a room. A chaining mode field may have values such as "State chaining mode", "Avatar chaining mode", "Unlocked chaining mode", "Locked chaining mode", and "AR object chaining mode". A physical proximity of user's field may contain an actual physical distance between the chained user and the primary HMD user. For some embodiments, the distance may be estimated and may be indicated with a distance unit, such as meters or feet. A relative position of chained users in the room field may contain a position of the chained HMD user relative to the primary HMD user. This information may be used for presenting direction of the chained user relative to the primary user.

Figure 10:
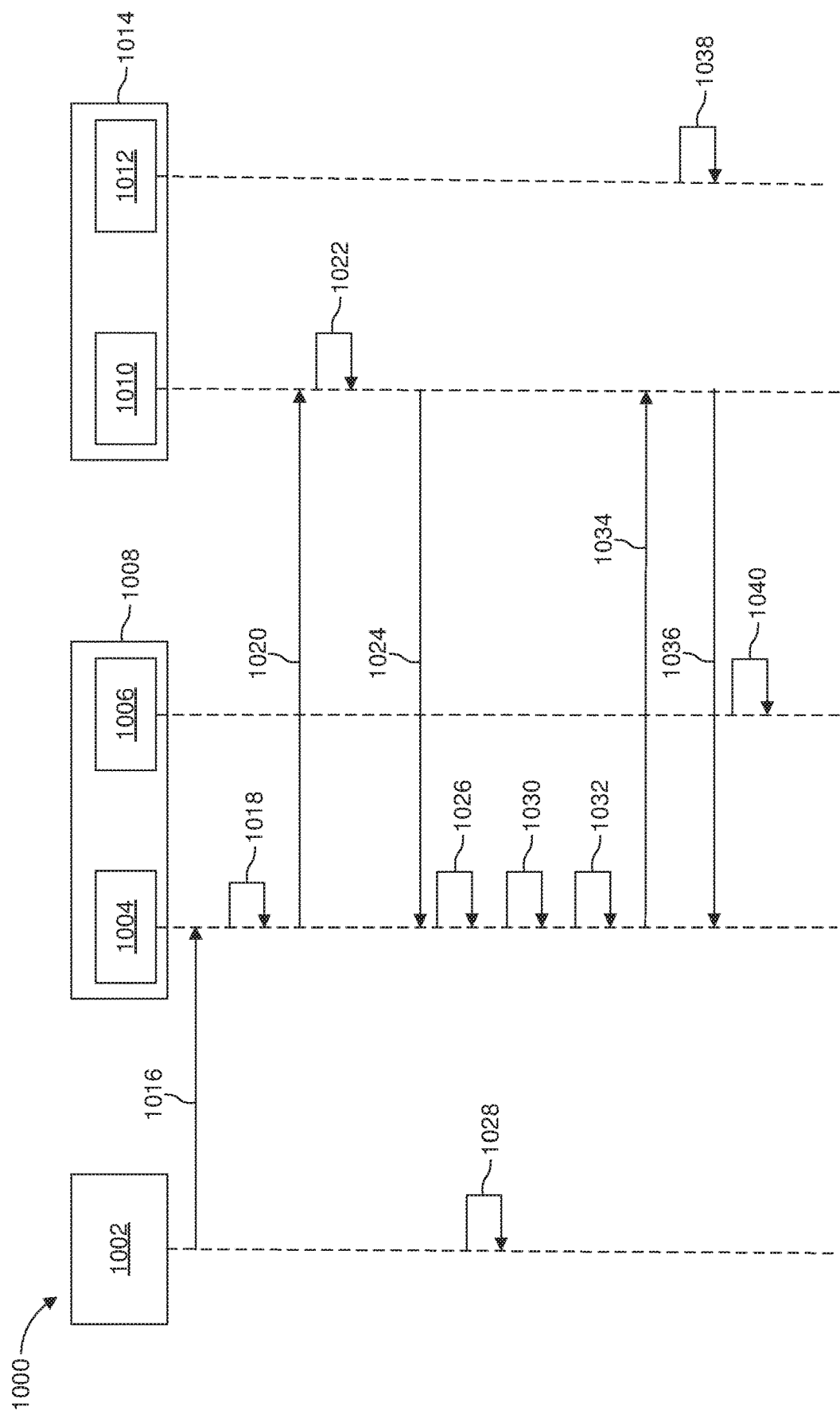
FIG. 10 is a message sequencing diagram illustrating an example process for chaining content on two HMD devices according to some embodiments.

FIG. 10 is a message sequencing diagram illustrating an example process for chaining content on two HMD devices according to some embodiments. For some embodiments of a process 1000, a chaining controller 1004 of a chained HMD device 1008 may receive 1016 a user input from a user 1002 indicating a chained viewer 1002 has begun using an HMD's user interface (UI). The chaining controller 1004 may select 1018 a primary HMD device and may send 1020 a chaining request with a user identifier to a chained content provider 1010 of the primary HMD device 1014. The chained-content provider 1010 may determine 1022 playback information parameters and may send 1024 a playback information update to the chaining controller 1004. For some embodiments, the chained-content provider 1010 may wait until the chaining mode is determined 1032 before sending 1024 the playback information update to the chaining controller 1004. The playback information update may include one or more fields for, e.g., accepted chaining modes, content description, content type, playback state, content stream, viewport information stream, AR scene information, and primary viewers activity-level. The chaining controller 1004 may perform 1026 proximity detection to determine the proximity of the chained HMD device 1008 to the primary HMD device 1014. The chained viewer 1002 may perform 1028 a gesture and the chaining controller 1004 may detect 1030 the gesture. The chaining controller 1004 may determine (or detect) 1032 the chaining mode and may send 1034 a chaining mode update to the chained content player 1010 of the primary HMD device 1014. The chaining mode update may include one or more fields for, e.g., chaining mode, proximity of users, and relative position of the chained user in the room. For some embodiments, chained content (or updated chained content in some embodiments) may be sent 1036 from the chained content player 1010 to the chaining controller 1004. The chained content (or updated chained content) sent 1036 may include the content that will be displayed 1038, 1040 in accordance with the selected or determined chaining mode. Both the chained content player 1006 of the chained HMD device 1008 and the primary content player 1012 of the primary HMD device 1014 may output 1038, 1040 the playback information on their respective displays. For some embodiments, an internal communication message (not shown) may be sent from the chaining controller 1004 to the chained content player 1006 prior to output 1040.

Figure 11:
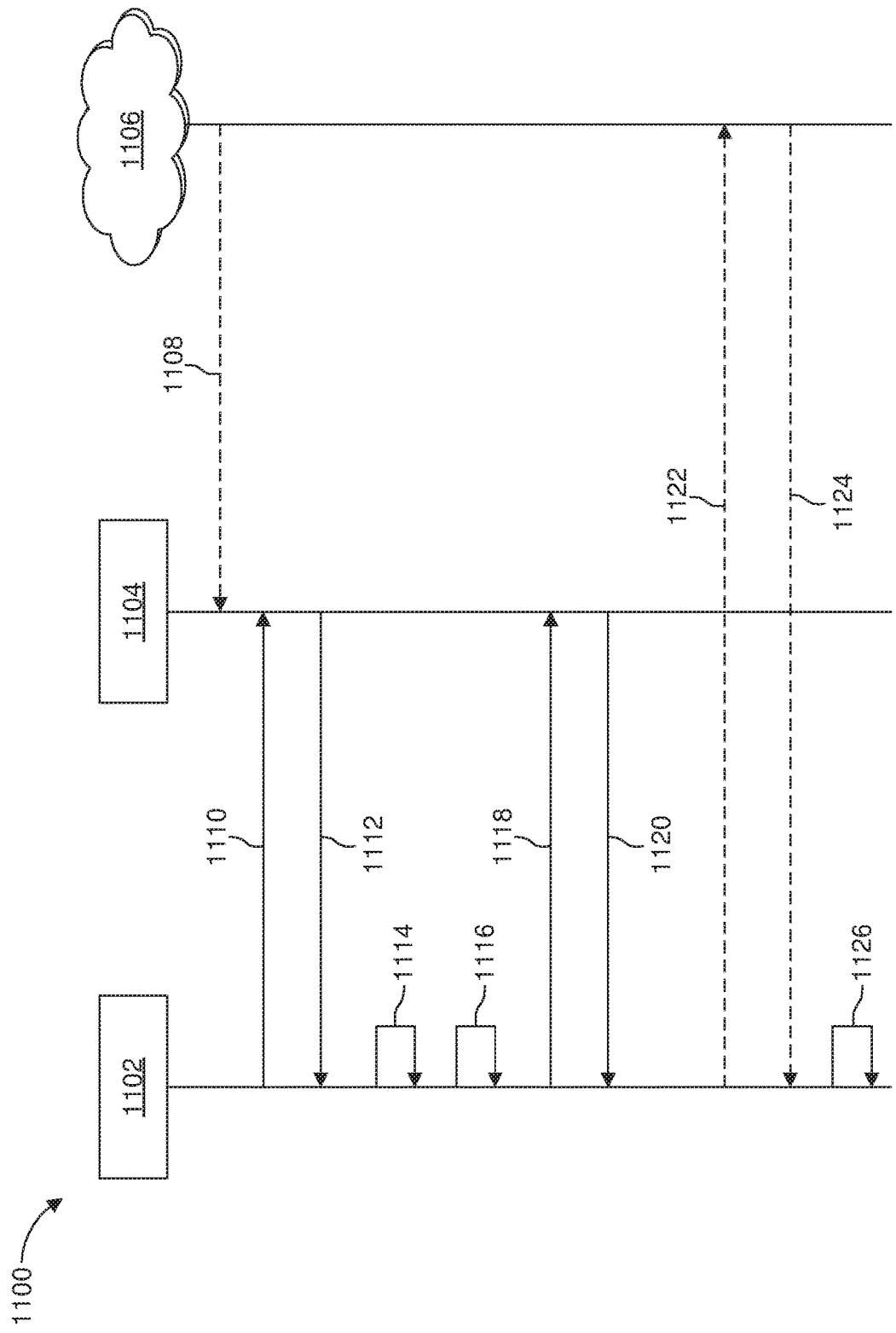
FIG. 11 is a message sequencing diagram illustrating an example process for displaying synchronized playback according to some embodiments.

FIG. 11 is a message sequencing diagram illustrating an example process for displaying synchronized playback according to some embodiments. For some embodiments of a process 1100, the primary 1104 and secondary 1102 VR user devices may communicate via, e.g., Bluetooth, Wi-Fi, or similar LAN or peer-to-peer communication protocol or technology. For some embodiments, a primary VR user device 1104 may receive 1108 VR content from a server 1106 on the Internet. A secondary VR user device 1102 may send 1110 an initial sharing request to a primary VR device 1104. The primary VR user device 1104 may send 1112 a sharing acceptance to the secondary VR user device 1102. The secondary VR user device 1102 may perform 1114 proximity detection to determine the proximity of the primary VR user device 1104 to the secondary VR user device 1102. The secondary VR user device 1102 may select 1116 a sharing mode and may send 1118 a sharing parameters message to the primary VR user device 1104. The primary VR user device 1104 may send 1120 a content identifier (ID) and viewing parameters (or viewing information) to the secondary VR user device 1102. Message 1120 may include a link to VR content available from a server and may include one or more URLs or web addresses to enable secondary VR user device 1102 to access such content. The secondary VR user device 1102 may send a VR content request 1122 using the link to the VR content. The secondary VR user device 1102 may receive 1124 VR content and may perform 1126 synchronized playback of the VR content. The synchronized VR content may be displayed to a user of the secondary VR user device 1102 as part of a chained VR experience. The synchronized VR content may be displayed to a user of the secondary VR user device 1102 according to a display format and/or a level of immersiveness associated with the sharing mode selected in step 1116. VR content may be delivered to each VR device via an independent Internet connection or other connection method for some embodiments.

For some embodiments, proximity detection 1114 and sharing mode detection (or immersiveness mode or level of immersiveness for some embodiments) 1116 may be continually updated. For some embodiments, an experience-sharing level may be changed so that the degree of immersiveness increases. Similarly, for some embodiments, the experience-sharing level may be changed so that the degree of immersiveness decreases. For some embodiments, synchronized playback 1126 may include synchronizing displaying of content displayed on a local VR device with the displaying of content displayed on a remote VR device.

Figure 12:
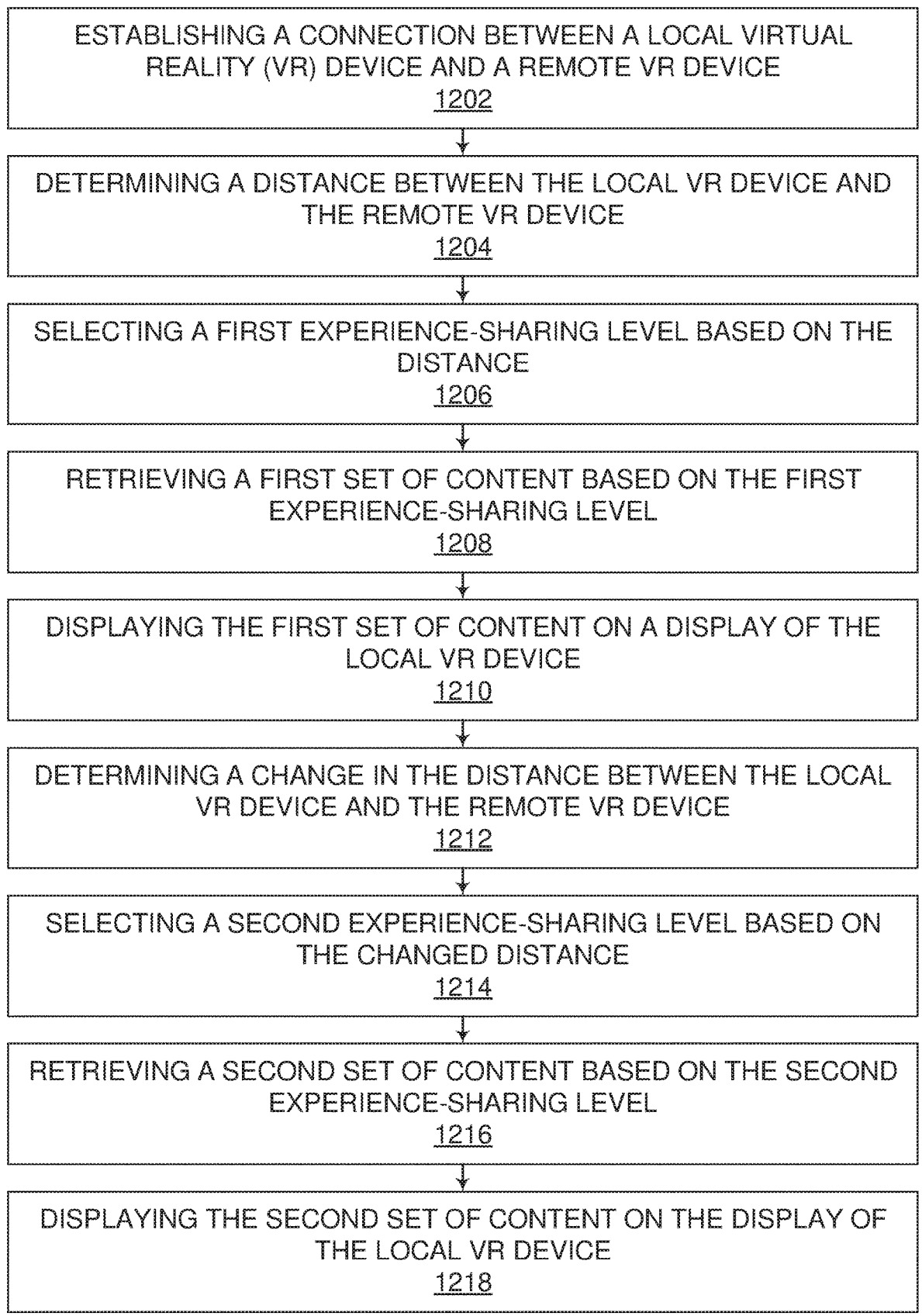
FIG. 12 is a flowchart illustrating an example process for displaying content that is retrieved based on a changed experience-sharing level according to some embodiments.

FIG. 12 is a flowchart illustrating an example process for displaying content that is retrieved based on a changed experience-sharing level according to some embodiments. Some embodiments of a method 1200 may include establishing 1202 a connection between a local virtual reality (VR) device and a remote VR device and determining 1204 a distance between the local VR device and the remote VR device. In some embodiments, the process 1200 may include selecting 1206 a first experience-sharing level based on the distance and retrieving 1208 a first set of content based on the first experience-sharing level. Some embodiments of a method 1200 may include displaying 1210 the first set of content on a display of the local VR device. In some embodiments, the process 1200 may include determining 1212 a change in the distance between the local VR device and the remote VR device and selecting 1214 a second experience-sharing level based on the changed distance. In some embodiments, the process 1200 may include retrieving 1216 a second set of content based on the second experience-sharing level and displaying 1218 the second set of content on the display of the local VR device. For some embodiments, the local and remote VR devices identified as a first and a second VR device. For some embodiments, an experience-sharing level may be a level of immersiveness or may be associated with a level of immersiveness. For example, increasing the level of immersiveness may increase the degree to which a user of a local VR device feels immersed in the VR environment of a remote VR device. In some embodiments, an apparatus may include a processor and a non-transitory computer-readable medium storing instructions that are operative, when executed by the processor, to perform the method 1200.

In some embodiments, the example process includes chaining mode detection. In some embodiments, the example process and/or chaining mode detection includes pairing of a primary HMD device and a chained HMD device. Pairing of a primary HMD device and a chained HMD device may, e.g., include selection of a primary HMD device. In some embodiments, a user, via a user interface, may choose a primary HMD with which to pair. In some embodiments, a user, via a user interface, may choose a pairing mode for which selection of a primary HMD device is to be performed. For some embodiments, a user interface may display (or present) pairing data that indicates a primary and a secondary VR device. For some embodiments, a user interface may display (or present) pairing selection data that enables a user to select a pairing of a primary HMD user and a secondary HMD user. For example, in some embodiments, a fixed-pairing for HMD devices (FPD) mode may be selected and/or a proximity-based pairing for (e.g.,) HMD devices (PPD) mode may be selected. In some embodiments, in FPD mode, the primary HMD device is not changed after the pairing of the primary HMD device and the chained HMD device is performed. In FPD mode, the chained viewer may use the user interface of the chaining controller and may select a primary HMD device to be used in a chained VR experience.

For example, in some embodiments, in PPD mode the primary HMD device is not fixed in the pairing of the primary HMD device and the chained HMD device, rather the primary HMD device may be dynamically selected so that distances from the chained HMD device to known HMD devices are detected first. For example, in some embodiments, then an HMD device that is the shortest distance to the chained HMD device is selected to be used as a primary HMD device.

In some embodiments, a playback information update message may be provided. The chaining controller may send a chaining request which may be received by the chained-content provider in the primary HMD device. The chained-content provider may prepare a playback information update message for the chained VR experience and may transmit the prepared message as a response for the chaining controller module. The playback information update message may include accepted chaining modes, content description, content type, playback state, content stream, view port information stream, AR scene information, and/or viewer's (e.g., primary viewers and/or other viewer's) activity-level.

In some embodiments, accepted chaining mode(s) may be defined. In some embodiments, by default, all chaining modes may be accepted. In some embodiments, the primary viewer may be able to select one or more chaining modes that may be allowed to be used in a chained VR experience.

In some embodiments, the primary viewer may use his or her HMD for AR purposes. In such scenarios, the camera of the primary viewer's HMD may be used to capture a video feed of the scene. The AR scene detection module may perform tracking for the video feed of the scene of the primary viewer, detect AR objects in the scene, and display a user interface which may, e.g., enable the primary user to select an AR object or a set of AR objects to be chained. In some embodiments, in the case of AR object chaining, the chained-content provider module, for example, may include the AR scene information to the playback information update message to define a video stream for the scene of a primary viewer and AR objects stream providing information about the chained AR objects that are visible in the video stream.

In some embodiments, the detection of the primary viewer activity-level may be based on the acceleration values obtained from the HMD direction sensor and existing analysis methods capable of detecting user's activity from acceleration data.

In some embodiments, the chained-content provider may determine the other playback information parameters and may deliver the parameters in a playback information message for the chaining controller.

In some embodiments, physical proximity of users and/or HMDs is provided. The chaining controller may, for example, orchestrate detection of the actual physical distance between the chained viewer and the primary viewer. For example, in some embodiments, detection of physical proximity of users may be based on: proximity sensor data, visual estimation data, and/or location services.

HMDs used in a chained VR experience may include proximity sensors, such as Bluetooth devices that have a signal strength indicator (RSSI) that may be used in rough-level estimation of the distance between the primary HMD device and the chained HMD device.

The camera in the chained HMD device may produce a (scene) video feed of the room, which may be used for visual estimation of distances. The video feed may be used in visual analysis that detects the primary HMD device in the video feed and estimates the distance from the camera to the primary HMD device in the video feed.

Location services available in a physical room or smart space may be used in detection of physical proximity of users, too. The location services may be based on the existing camera-based, beacon based, or ultrasound-based indoor positioning systems using sensors of the surrounding physical environment capable of detecting the actual physical location of an HMD user in the physical space, such as the systems described in Mautz, Rainer, *Overview of Current Indoor Positioning Systems*, 35.1 GEODEZIJA IR KARTOGRAFIJA, 18-22 (2009).

A chaining controller may request a location service to perform indoor positioning for the primary user and the chained user and then use the detected physical locations of the users in computation of the physical proximity of the users.

In some embodiments, gesture detection is provided. The chaining controller may detect gestures of the chained viewer. The camera in the chained HMD device may capture the video feed of the gestures of the chained viewer. The gesture detection may be based on existing visual gesture detection techniques that may be used in analysis of the video feed and detection of the well-defined gestures used in the controlling of the chained VR experience, such as techniques described in the articles Francke, et al., *Real-Time Hand Gesture Detection and Recognition Using Boosted Classifiers and Active Learning*, ADVANCES IN IMAGE AND VIDEO TECHNOLOGY 533-547 (2007) and Dardas and Georganas, *Real-Time Hand Gesture Detection and Recognition Using Bag-of-Features and Support Vector Machine Techniques*, 60.11 IEEE TRANSACTIONS ON INSTRUMENTATION AND MEASUREMENT 3592-3607 (2011).

In some embodiments, a chaining mode may be updated. For example, the chaining controller module may use the current chaining mode, the content type defined in the playback information message, the detected physical proximity of the primary viewer and the chained viewer, and the detected gesture of the chained viewer and may determine an updated chaining mode for the chained VR experience. The chaining controller may deliver a chaining mode update message for the primary HMD device that may then adapt for the view displayed in the primary HMD device for the defined chaining mode.

In some embodiments, output in the chained VR experience may be based on actions that are performed in the chained HMD device and in the primary HMD device.

In some embodiments, the chained-content player performs output of playback information in the chained HMD device. For example, based on the chaining mode, the chained HMD device may provide: state chaining, avatar chaining, unlocked chaining, locked chaining, and/or AR object chaining views for the chained viewer.

In some embodiments, the AR object chaining mode, the AR scene chaining module may use the video stream that is defined in the AR scene information update and extract an image of the AR object in the scene of the primary viewer for detecting the AR objects that are visible both in the scene of the primary viewer and the scene of the chained viewer. The camera of the chained viewers HMD may be used to capture video feed of the chained viewer's scene. The AR scene chaining module uses the image of the AR object, performs visual analysis for the video feed of the chained viewer's scene, identify the position of the AR object in the scene of the chained viewer, and finally displays the delivered AR content in the correct position on top of the identified AR object in the field of view of the chained HMD user.

The primary content player in the primary HMD device represents available chaining information for the primary viewer. Based on the chaining mode, the primary content player may provide a state chaining, avatar chaining, unlocked chaining, locked chaining, and AR object chaining views for the primary viewer.

The described system uses a peer-to-peer model in which the primary viewer's HMD device and the chained viewer's HMD device are interconnected nodes that share resources with each other without the use of a centralized administrative system. However, a client-server model also may be used. For example, there may be a centralized server to manage communication between HMDs and chaining of VR experiences.

Systems and methods described herein in accordance with some embodiments, e.g., may allow for parental monitoring applications (such as in a home environment). For example, systems and methods described herein in accordance with some embodiments enable parents to follow use of VR experiences in a child's HMD device.

For some embodiments, a set of users (e.g., students in a school class) may be using VR glasses. In a classroom, there may be a chained viewer (e.g., a teacher) that uses the system in PPD mode and walks to the front of the class. The physical proximity of the primary viewer and the chained viewer may be used in the pairing of HMD devices so that the user that has the closest distance to the chained viewer is selected to be the primary viewer in chaining of a VR experience.

Systems and methods described herein in accordance with some embodiments, may be used to increase the level of engagement in gaming. For example, a chained user may follow how a primary user s car game is progressing in the primary HMD device.

For some embodiments, a user may have multiple HMD devices. The user may use non-transparent VR goggles and separate see-through AR goggles. The user may be chaining these devices and using the same VR experience for both devices. For example, a user may follow a football game via the VR goggles. The user may go to get a drink. The user may take the VR goggles off (the primary HMD device) and wear the AR goggles (the chained HMD device) and may continue following the football game while walking to the kitchen.

Some benefits of systems described herein in accordance with some embodiments may include ease with which to have shared VR experiences with users in a physical space; chaining of VR experiences in HMDs; and delivery of information between users of a chained VR sessions. Such delivery of information may include indication for users that a chained (e.g., a 360-degree video) VR session is obtained, delivery of information on a user's state (e.g., information indicating that a user has left from the session), and delivery of information on watching direction of HMD users.

FIG. 13 is a flowchart illustrating an example process for displaying content that is retrieved based on an experience-sharing level set via gesturing according to some embodiments. Some embodiments of a method 1300 may include establishing 1302 a connection between a first virtual reality (VR) device and a second VR device. In some embodiments, the process 1300 may include detecting 1304 a first gesture of a user. Some embodiments of a method 1300 may include selecting 1306 a first level of immersiveness based on the first gesture of the user. In some embodiments, the process 1300 may include retrieving 1308 a first set of content based on the first level of immersiveness. Some embodiments of a method 1300 may include displaying 1310 the first set of content on a display of the first VR device. In some embodiments, the process 1300 may include detecting 1312 a second gesture of the user. Some embodiments of a method 1300 may include selecting 1314 a second level of immersiveness based on the second gesture of the user. In some embodiments, the process 1300 may include retrieving 1316 a second set of content based on the second level of immersiveness. Some embodiments of a method 1300 may include displaying 1318 the second set of content on the display of the first VR device. In some embodiments, an apparatus may include a processor and a non-transitory computer-readable medium storing instructions that are operative, when executed by the processor, to perform the method 1300.

Figure 14:
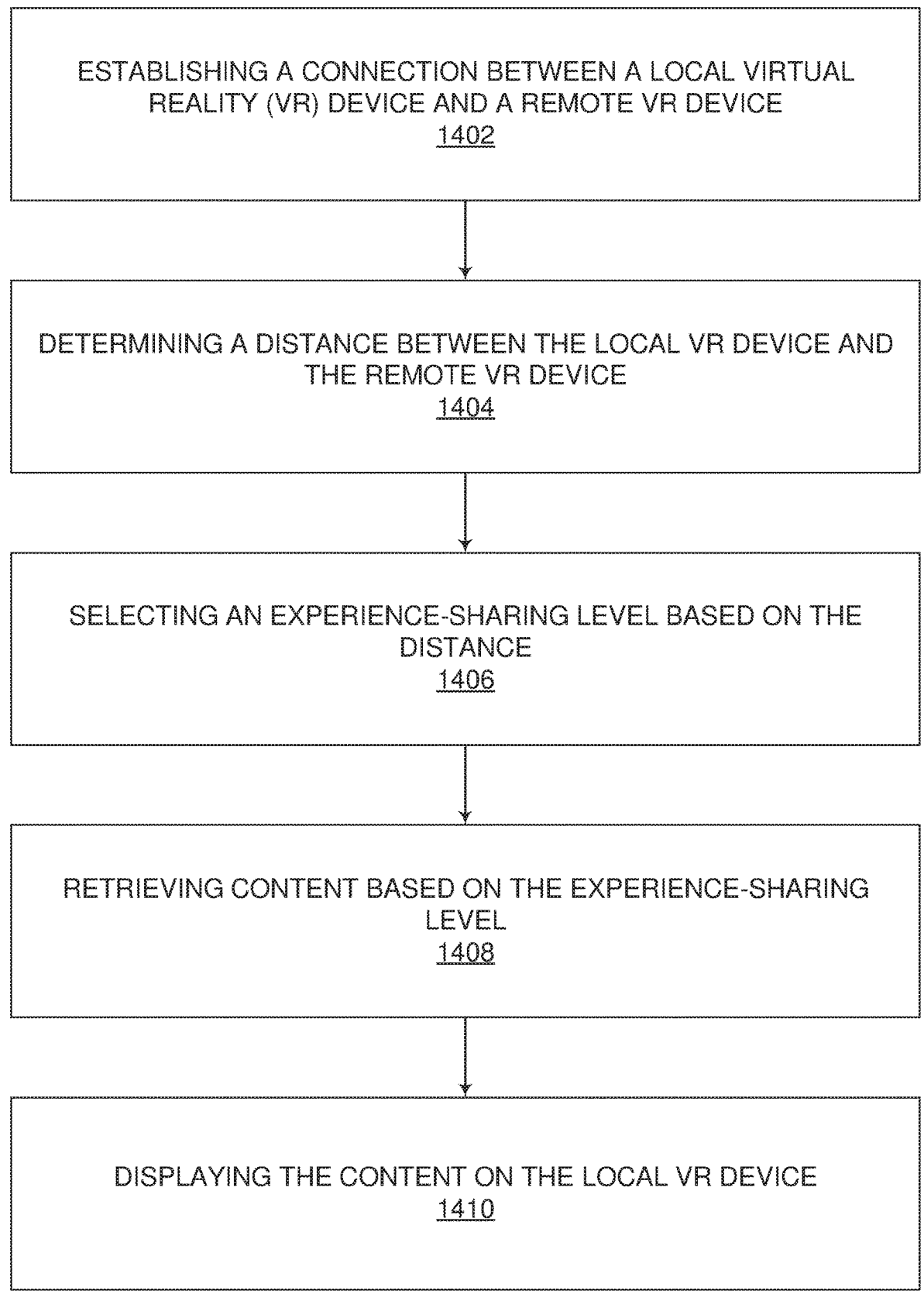
FIG. 14 is a flowchart illustrating an example process for displaying content that is retrieved based on an experience-sharing level according to some embodiments.

FIG. 14 is a flowchart illustrating an example process for displaying content that is retrieved based on an experience sharing level according to some embodiments. Some embodiments of a method 1400 may include establishing 1402 a connection between a local virtual reality (VR) device and a remote VR device. In some embodiments, the process 1400 may include determining 1404 a distance between the local VR device and the remote VR device. Some embodiments of the process 1400 may include selecting 1406 an experience-sharing level based on the distance. In some embodiments, the process 1400 may include retrieving 1408 content based on the experience-sharing level. Some embodiments of the process 1400 may include displaying 1410 the content on the local VR device. In some embodiments, an apparatus may include a processor and a non-transitory computer-readable medium storing instructions that are operative, when executed by the processor, to perform the method 1400.

Figure 15:
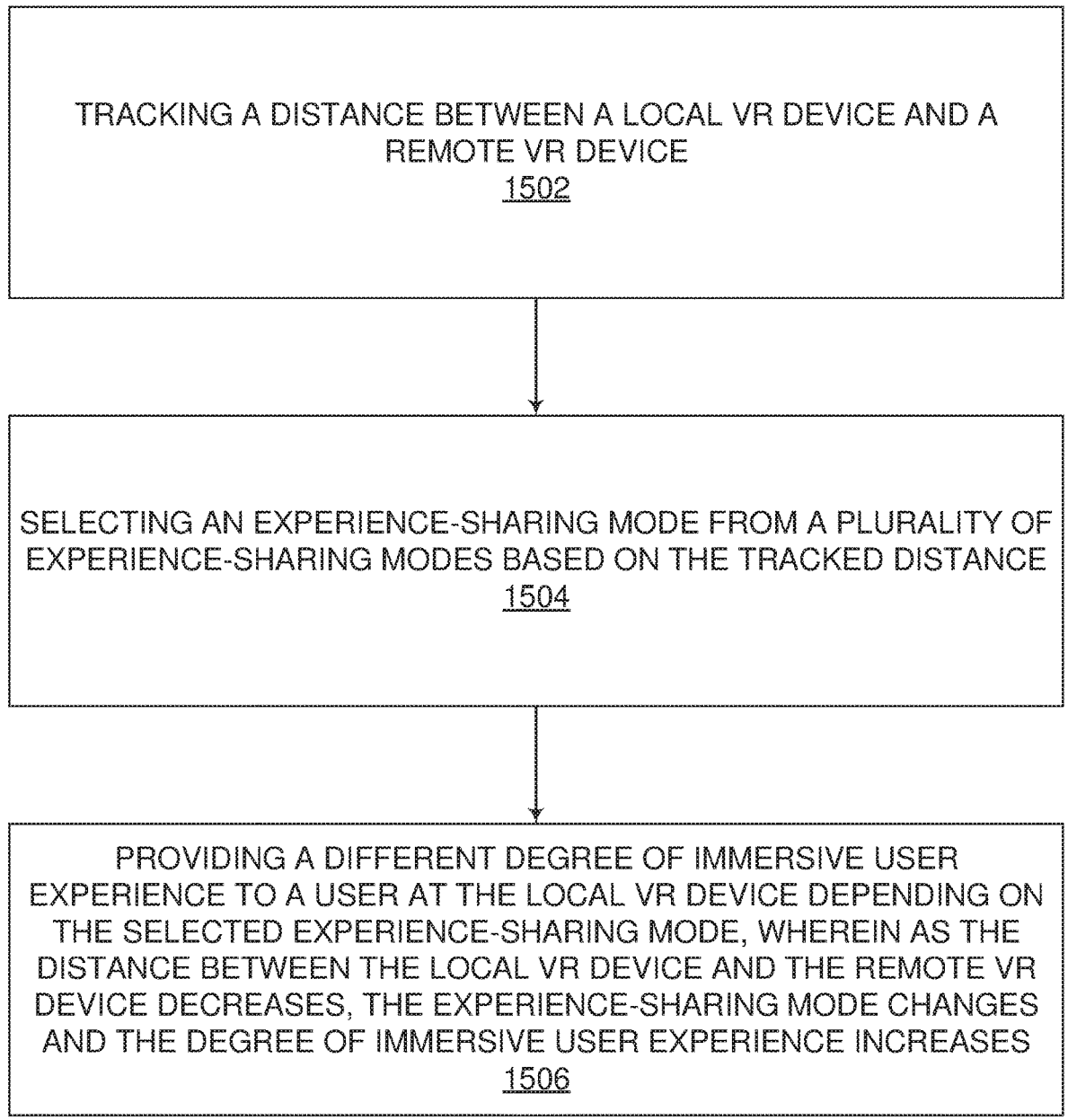
FIG. 15 is a flowchart illustrating an example process for selecting an experience-sharing mode based on tracked distance according to some embodiments.

FIG. 15 is a flowchart illustrating an example process for selecting an experience-sharing mode based on tracked distance according to some embodiments. Some embodiments of a method 1500 may include tracking 1502 a distance between a local VR device and a remote VR device. In some embodiments, the process 1500 may include selecting 1504 an experience-sharing mode from a plurality of experience-sharing modes based on the tracked distance. Some embodiments of a method 1500 may include providing 1506 a different degree of immersive user experience to a user at the local VR device depending on the selected experience-sharing mode, wherein as the distance between the local VR device and the remote VR device decreases, the experience-sharing mode changes and the degree of immersive user experience increases. In some embodiments, an apparatus may include a processor and a non-transitory computer-readable medium storing instructions that are operative, when executed by the processor, to perform the method 1500. For some embodiments of the process 1500, providing 1506 a different degree of immersive user experience may include retrieving content based on the experience-sharing level; and displaying the content on a display of the local VR device.

Figure 16:
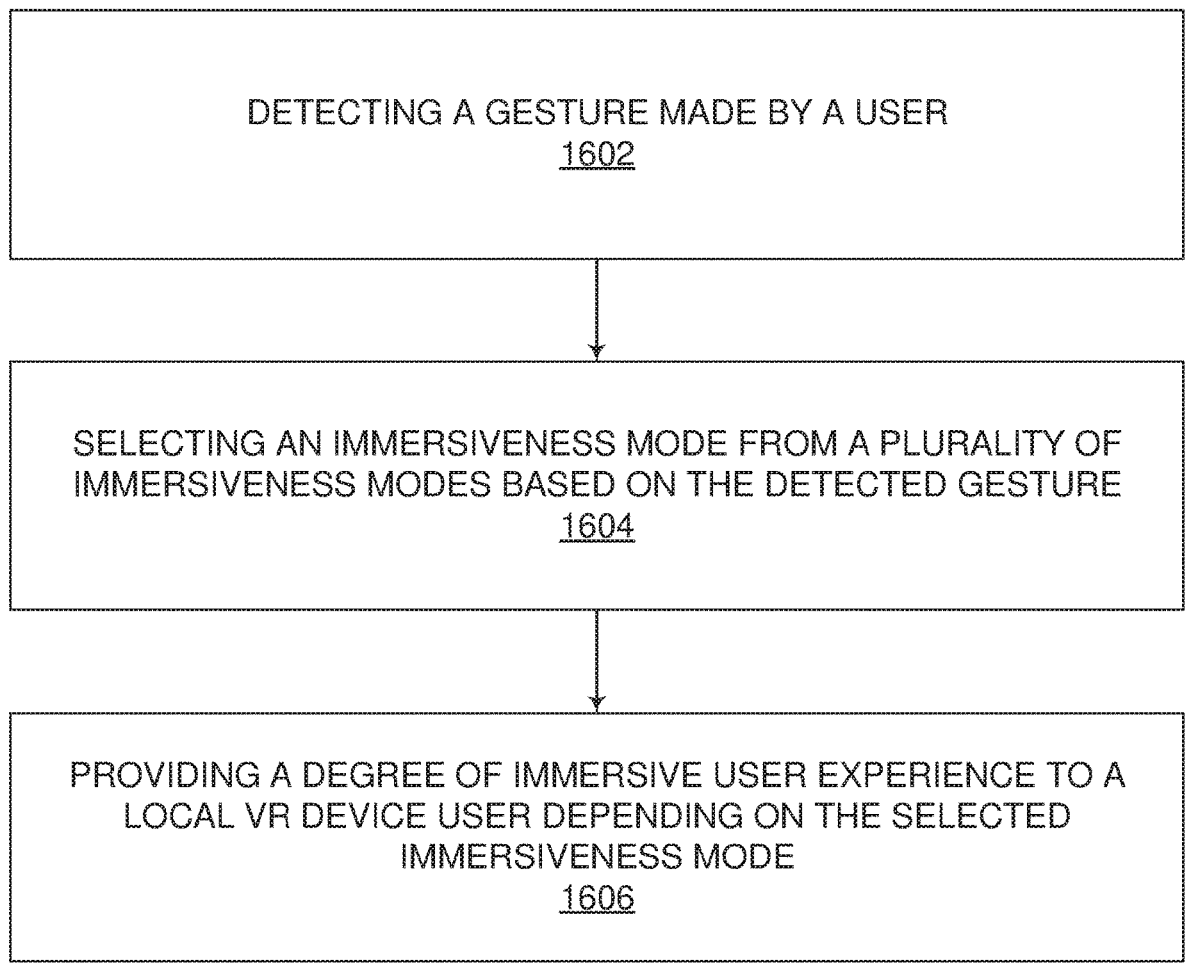
FIG. 16 is a flowchart illustrating an example process for selecting an immersiveness mode based on a detected gesture according to some embodiments.

FIG. 16 is a flowchart illustrating an example process for selecting an immersiveness mode based on a detected gesture according to some embodiments. Some embodiments of a method 1600 may include detecting 1602 a gesture made by a user. In some embodiments, the process 1600 may include selecting 1604 an immersiveness mode from a plurality of immersiveness modes based on the detected gesture. Some embodiments of a method 1600 may include providing 1606 a degree of immersive user experience to a local VR device user depending on the selected immersiveness mode. In some embodiments, an apparatus may include a processor and a non-transitory computer-readable medium storing instructions that are operative, when executed by the processor, to perform the method 1600. For some embodiments of the process 1600, providing 1606 a degree of immersive user experience may include retrieving content based on the experience-sharing level; and displaying the content on a display of the local VR device.

Figure 17:
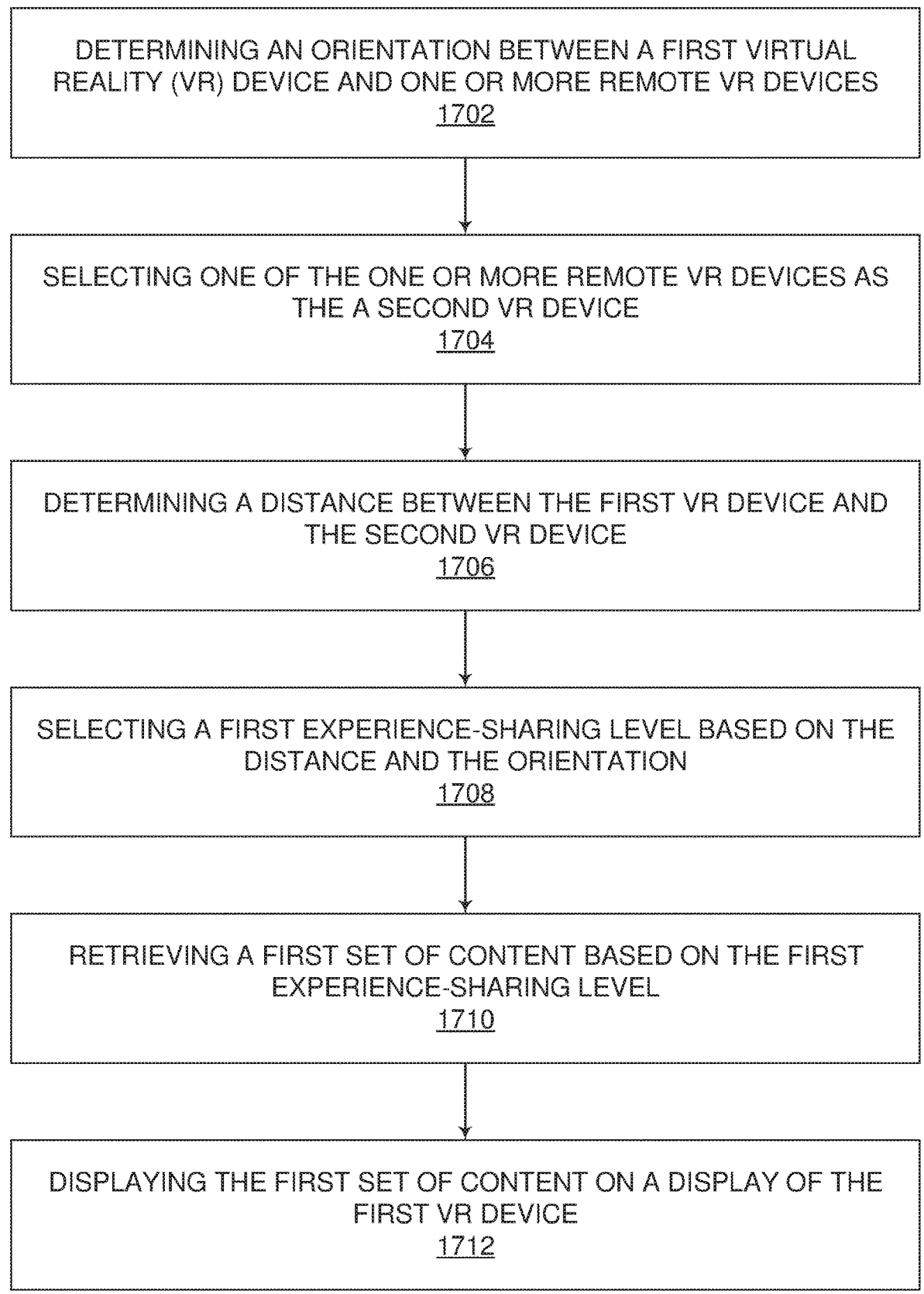
FIG. 17 is a flowchart illustrating an example process for selecting an immersiveness mode based on an orientation and distance between two VR devices according to some embodiments.

FIG. 17 is a flowchart illustrating an example process for selecting an immersiveness mode based on an orientation and distance between two VR devices according to some embodiments. Some embodiments of a method 1700 may include determining 1702 an orientation between a first virtual reality (VR) device and one or more remote VR devices. In some embodiments, the process 1700 may include selecting 1704 one of the one or more remote VR devices as a second VR device. In some embodiments, the process 1700 may include determining 1706 a distance between the first VR device and the second VR device. In some embodiments, the process 1700 may include selecting 1708 a first experience-sharing level based on the distance and the orientation. In some embodiments, the process 1700 may include retrieving 1710 a first set of content based on the first experience-sharing level. In some embodiments, the process 1700 may include displaying 1712 the first set of content on a display of the first VR device. Some embodiments of an apparatus may include a processor; and a non-transitory computer-readable medium storing instructions that are operative, when executed by the processor, to perform the process 1700.

In some embodiments, an orientation of one AR/VR device with respect to another AR/VR device may be used to initiate a chained VR relationship between the devices. Orientation of one device relative to another device may be determined using orientation sensors built into the devices, together with position information for the devices. The position information may be determined using an external localization service (e.g., beacons), or using cameras or other sensors. For example, if the user of a first AR/VR device orients the device toward a second AR/VR device, this orientation may be detected and may cause the first AR/VR device to initiate a sharing request to the second AR/VR device, or to offer such an option to the user of the first AR/VR device. The orientation may be used together with distance. For example, a sharing request may be offered or initiated based on detecting that the first device is oriented towards the second device and determining that the first device is in proximity to the second device (e.g., the distance between first and second devices are below some threshold distance). Orientation may be used to disambiguate the selection of a device for a shared experience if multiple devices are in proximity to the first device (see, for example, FIG. 2).

In some embodiments, an orientation of a first AR/VR device with respect to a second AR/VR device may be used to determine a sharing mode (or a level of immersiveness for a shared session). Orientation of the first device relative to the second device may be determined using orientation sensors built into the devices, together with position information for the devices. The position information may be determined using an external localization service (e.g. beacons) or using cameras or other sensors. For example, if the first device is oriented away from the second device, a first sharing mode using a low level of immersiveness may be selected. If, for example, the first device is oriented toward a position near the second device (e.g., within +/− 45 degrees of the position of the second device), a second sharing mode using a medium level of immersiveness may be selected. If the first device is oriented more directly toward the position of the second device (e.g., within +/− 10 degrees), a third sharing mode using a high level of immersiveness may be selected. The orientation may be used to determine an initial sharing mode, or the orientation may be used to update the sharing mode if the orientation changes. In some embodiments, the orientation may be used together with distance between the devices to determine the sharing mode. For example, each sharing mode may be associated with a distance condition and an orientation condition, such that the sharing mode is selected if both conditions are satisfied.

Figure 18:
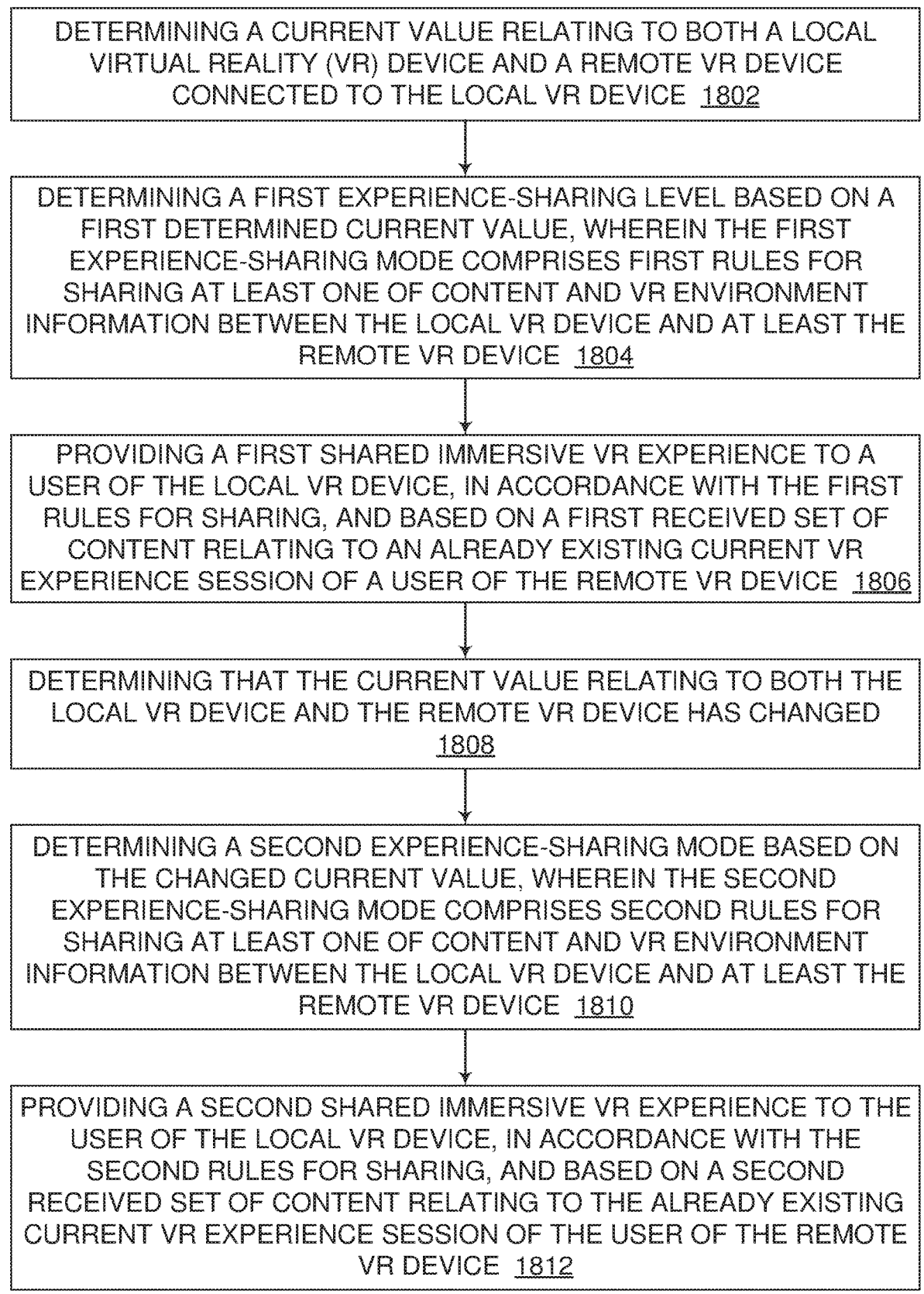
FIG. 18 is a flowchart illustrating an example process for selecting an immersiveness mode based on a changed value related to two VR devices according to some embodiments.

FIG. 18 is a flowchart illustrating an example process for selecting an immersiveness mode based on a changed value related to two VR devices according to some embodiments. Some embodiments of a method 1800 may include determining 1802 a current value relating to both a local virtual reality (VR) device and a remote VR device connected to the local VR device. Some embodiments of a method 1800 may further include determining 1804 a first experience-sharing level based on a first determined current value, wherein the first experience-sharing mode comprises first rules for sharing at least one of content and VR environment information between the local VR device and at least the remote VR device. Some embodiments of a method 1800 may further include providing 1806 a first shared immersive VR experience to a user of the local VR device, in accordance with the first rules for sharing, and based on a first received set of content relating to an already existing current VR experience session of a user of the remote VR device. Some embodiments of a method 1800 may further include determining 1808 that the current value relating to both the local VR device and the remote VR device has changed. Some embodiments of a method 1800 may further include determining 1810 a second experience-sharing mode based on the changed current value, wherein the second experience-sharing mode comprises second rules for sharing at least one of content and VR environment information between the local VR device and at least the remote VR device. Some embodiments of a method 1800 may further include providing 1812 a second shared immersive VR experience to the user of the local VR device, in accordance with the second rules for sharing, and based on a second received set of content relating to the already existing current VR experience session of the user of the remote VR device.

For some embodiments, the current value relating to the local and remote VR devices for a method 1800 may include a current distance between the local VR device and the remote VR device, a tracked value corresponding to a current recognized gesture of the user at the local VR device, a current location of the remote VR device, a tracked gaze of the user at the remote VR device, or a current orientation of the local VR device with respect to the remote VR device.

Some embodiments of an apparatus may include a processor; and a non-transitory computer-readable medium storing instructions that are operative, when executed by the processor, to perform the process 1800.

While the methods and systems in accordance with some embodiments are discussed in the context of virtual reality (VR), some embodiments may be applied to mixed reality (MR)/augmented reality (AR) contexts as well. While the application uses "VR" is some places and "AR" in other places, for some embodiments, if the application uses a "VR" device, an "AR" device may also be used, and vice versa. Also, although the term "head mounted display (HMD)" is used herein in accordance with some embodiments, some embodiments may be applied to a wearable device (which may or may not be attached to the head) capable of, e.g., VR, AR, and/or MR for some embodiments.

An example method in accordance with some embodiments may include: establishing a connection between a local virtual reality (VR) device and a remote VR device; determining a distance between the local VR device and the remote VR device; selecting a first experience-sharing level based on the distance; retrieving a first set of content based on the first experience-sharing level; displaying the first set of content on a display of the local VR device; determining a change in the distance between the local VR device and the remote VR device; selecting a second experience-sharing level based on the changed distance; retrieving a second set of content based on the second experience-sharing level; and displaying the second set of content on the display of the local VR device.

For some embodiments of the example method, the first set of content may include a first shared experience between a user of the local device and a user of the remote device, and the second set of content may include a second shared experience between the user of the local device and the user of the remote device.

For some embodiments of the example method, the first shared experience may be more immersive than the second shared experience.

For some embodiments of the example method, the first shared experience may be less immersive than the second shared experience.

For some embodiments of the example method, the first and second shared experiences may connect a user of the local device to an already existing VR experience session of a user of the remote device.

For some embodiments of the example method, determining the change in the distance may be determined after detecting the distance is below an absolute distance threshold.

For some embodiments of the example method, determining the change in the distance may be determined after detecting the distance is between a first absolute distance threshold distance and a second absolute distance threshold.

For some embodiments of the example method, the first experience-sharing level may be associated with a first level of immersiveness with a user, the second experience-sharing level may be associated with a second level of immersiveness with the user, and the first level of immersiveness with the user may be greater than the second level of immersiveness with the user.

For some embodiments of the example method, displaying the first set of content may display a summary description of a VR experience of the remote VR device on a portion of the display of the local VR device.

For some embodiments of the example method, displaying the first set of content may display a visual representation of a VR experience of the remote VR device on a portion of the display of the local VR device.

For some embodiments of the example method, displaying the second set of content may display a VR experience of the remote VR device on the display of the local VR device in a fully immersive mode.

For some embodiments of the example method, displaying the second set of content on a display of the local VR device may include synchronizing displaying of the second set of content on the local VR device with the remote VR device.

Some embodiments of the example method may further include retrieving viewport information of the remote VR device based on the first experience-sharing level, wherein retrieving the first set of content may retrieve the first set of content further based on the viewport information.

Some embodiments of the example method may further include retrieving viewing information for the remote VR device, wherein displaying the first set of content may be further based on the viewing information for the remote device.

Some embodiments of the example method may further include: detecting a gesture of a user; and adjusting the viewing information based on the gesture of the user, wherein displaying the first set of content may be further based on the adjusted viewing information for the remote device.

Some embodiments of the example method may further include detecting a gesture of a user, wherein selecting the first experience-sharing level is further based on the gesture of the user.

Some embodiments of the example method may further include detecting a voice command of a user, wherein selecting the first experience-sharing level may be further based on the voice command of the user.

Some embodiments of the example method may further include: detecting an orientation of the remote VR device; and adjusting the first set of content to generate an adjusted first set of content based on the orientation of the remote VR device, wherein displaying the first set of content may display the adjusted first set of content on the display of the local VR device.

For some embodiments of the example method, the first set of content may include a plurality of VR objects, and the plurality of VR objects may include a subset of a set of VR objects displayed on the remote device.

An example apparatus in accordance with some embodiments may include: a processor; and a non-transitory computer-readable medium storing instructions that are operative, when executed by the processor, to perform an example method described above.

Another example method in accordance with some embodiments may include: establishing a connection between a first virtual reality (VR) device and a second VR device; detecting a first gesture of a user; selecting a first level of immersiveness based on the first gesture of the user; retrieving a first set of content based on the first level of immersiveness; displaying the first set of content on a display of the first VR device; detecting a second gesture of the user; selecting a second level of immersiveness based on the second gesture of the user; retrieving a second set of content based on the second level of immersiveness; and displaying the second set of content on the display of the first VR device.

For some embodiments of another example method, displaying the first set of content may display a summary description of a VR experience of the second VR device on a portion of the display of the first VR device.

For some embodiments of another example method, displaying the first set of content may display a visual representation of a VR experience of the second VR device on a portion of the display of the first VR device.

For some embodiments of another example method, displaying the second set of content may display a VR experience of the second VR device on the display of the first VR device in a fully immersive mode.

Some embodiments of another example method may further include retrieving viewport information of the second VR device based on the first experience-sharing level, wherein retrieving the first set of content may retrieve the first set of content further based on the viewport information.

Some embodiments of another example method may further include displaying, on the display of the first VR device, an avatar associated with a user of the remote VR device.

Another example apparatus in accordance with some embodiments may include: a processor; and a non-transitory computer-readable medium storing instructions that are operative, when executed by the processor, to perform another example method described above.

A further example method in accordance with some embodiments may include: establishing a connection between a local virtual reality (VR) device and a remote VR device; determining a distance between the local VR device and the remote VR device; selecting an experience-sharing level based on the distance; retrieving content based on the experience-sharing level; and displaying the content on the local VR device.

A further example apparatus in accordance with some embodiments may include: a processor; and a non-transitory computer-readable medium storing instructions that are operative, when executed by the processor, to perform a further example method described above.

Another further example method in accordance with some embodiments may include: tracking a distance between a local VR device and a remote VR device; selecting an experience-sharing mode from a plurality of experience-sharing modes based on the tracked distance; and providing a different degree of immersive user experience to a user at the local VR device depending on the selected experience-sharing mode, wherein as the distance between the local VR device and the remote VR device decreases, the experience-sharing mode may change and the degree of immersive user experience may increase.

For some embodiments of another further example method, providing the different degree of immersive user experience may include: retrieving content based on the experience-sharing level; and displaying the content on a display of the local VR device.

For some embodiments of another further example method, displaying the content may display a summary description of a VR experience of the remote VR device on a portion of the display of the local VR device.

For some embodiments of another further example method, displaying the content may display a visual representation of a VR experience of the remote VR device on a portion of the display of the local VR device.

For some embodiments of another further example method, displaying the content may display a VR experience of the remote VR device on the display of the local VR device in a fully immersive mode.

Another further example apparatus in accordance with some embodiments may include: a processor; and a non-transitory computer-readable medium storing instructions that are operative, when executed by the processor, to perform another further example method described above.

An additional example method in accordance with some embodiments may include: detecting a gesture made by a user; selecting an immersiveness mode from a plurality of immersiveness modes based on the detected gesture; and providing a degree of immersive user experience to a local VR device user depending on the selected immersiveness mode.

For some embodiments of an additional example method, providing the degree of immersive user experience may include: retrieving content based on an experience-sharing level; and displaying the content on a display of a local VR device.

For some embodiments of an additional example method, displaying the content may display a summary description of a VR experience of a remote VR device on a portion of the display of the local VR device.

For some embodiments of an additional example method, displaying the content may display a visual representation of a VR experience of a remote VR device on a portion of the display of the local VR device.

For some embodiments of an additional example method, displaying the content may display a VR experience of a remote VR device on the display of the local VR device in a fully immersive mode.

Some embodiments of an additional example method may further include: tracking a distance between the local VR device and the remote VR device; and changing the immersiveness mode based on the tracked distance, wherein as the distance between the local VR device and the remote VR device decreases, the immersiveness mode may change and the degree of immersive user experience may increase.

An additional example apparatus in accordance with some embodiments may include: a processor; and a non-transitory computer-readable medium storing instructions that are operative, when executed by the processor, to perform an additional example method described above.

A further additional example method in accordance with some embodiments may include: determining an orientation between a first virtual reality (VR) device and one or more remote VR devices; selecting one of the one or more remote VR devices as a second VR device; determining a distance between the first VR device and the second VR device; selecting a first experience-sharing level based on the distance and the orientation; retrieving a first set of content based on the first experience-sharing level; and displaying the first set of content on a display of the first VR device;

For some embodiments of a further additional example method, the orientation between the first VR device and the second device may indicate that the first VR device is oriented towards the second device.

Some embodiments of a further additional example method may further include: determining a change in the distance between the first VR device and the second VR device; selecting a second experience-sharing level based on the changed distance; retrieving a second set of content based on the second experience-sharing level; and displaying the second set of content on the display of the first VR device.

A further additional example apparatus in accordance with some embodiments may include: a processor; and a non-transitory computer-readable medium storing instructions that are operative, when executed by the processor, to perform a method listed above.

Another additional example method in accordance with some embodiments may include: determining a current value relating to both a local virtual reality (VR) device and a remote VR device connected to the local VR device; determining a first experience-sharing level based on a first determined current value, wherein the first experience-sharing mode may include first rules for sharing at least one of content and VR environment information between the local VR device and at least the remote VR device; providing a first shared immersive VR experience to a user of the local VR device, in accordance with the first rules for sharing, and based on a first received set of content relating to an already existing current VR experience session of a user of the remote VR device; determining that the current value relating to both the local VR device and the remote VR device has changed; determining a second experience-sharing mode based on the changed current value, wherein the second experience-sharing mode may include second rules for sharing at least one of content and VR environment information between the local VR device and at least the remote VR device; and providing a second shared immersive VR experience to the user of the local VR device, in accordance with the second rules for sharing, and based on a second received set of content relating to the already existing current VR experience session of the user of the remote VR device.

For some embodiments of another additional example method, the current value relating to both the local VR device and the remote VR device may include at least one of: a current distance between the local VR device and the remote VR device, a tracked value corresponding to a current recognized gesture of the user at the local VR device, a current location of the remote VR device, a tracked gaze of the user at the remote VR device, or a current orientation of the local VR device with respect to the remote VR device.

For some embodiments of another additional example method, providing the first shared immersive VR experience to the user of the local VR device may include displaying the first received set of content at a display of the local VR device.

Some embodiments of another additional example method may further include establishing the connection between the local VR device and the remote VR device.

Another additional example apparatus in accordance with some embodiments may include: a processor; and a non-transitory computer-readable medium storing instructions that are operative, when executed by the processor, to perform a method listed above.

Another further additional example apparatus in accordance with some embodiments may include: a proximity sensor; a processor; and a non-transitory computer-readable medium storing instructions that are operative, when executed by the processor, to perform a method listed above.

Some embodiments of another further additional example method may further include: an HMD direction sensor; and a camera.

Some embodiments of a method may include: transmitting, from a first virtual reality (VR) device, a request to establish a connection at the first VR device to a VR experience of a second VR device; receiving an acknowledgement to establish the connection; determining, at the first VR device, a distance between the first VR device and the second VR device; selecting an experience sharing level from a plurality of available sharing levels based on the distance, wherein each sharing level of the plurality of available sharing levels corresponds to a mode of operation in which information from the VR experience of the second VR device is shared with and displayed on the first VR device; retrieving content based on the experience sharing level; and displaying the content at the first VR device.

For some embodiments, determining the distance may determine the distance to be in a first range of values, and displaying the content may display a summary description of the VR experience of the second VR device on a portion of the display of the first VR device.

For some embodiments, determining the distance may determine the distance to be in a second range of values, and displaying the content may display a visual representation of the VR experience of the second VR device on a portion of the display of the first VR device.

For some embodiments, determining the distance may determine the distance to be in a third range of values, and displaying the content may display the VR experience of the second VR device on the display of the first VR device in a fully immersive mode.

For some embodiments, determining the distance may determine the distance periodically, selecting the experience sharing level may select an updated experience sharing level if the distance changes, retrieving content may retrieve updated content based on the updated experience sharing level, and displaying the content may display the updated content.

For some embodiments, determining the distance may determine the distance based on Bluetooth signal strength.

For some embodiments, determining the distance may determine the distance based on an analysis of a scene video feed at the second VR device.

For some embodiments, retrieving content may retrieve content from a server in the Internet.

For some embodiments, a method may further include: retrieving, for the experience sharing level, viewport information of the second VR device, wherein retrieving content may retrieve content further based on the viewport information.

For some embodiments, the first VR device may be a secondary VR device, and the second VR device may be a primary VR device.

Some embodiments of an apparatus may include: a processor; and a non-transitory computer-readable medium storing instructions that are operative, when executed by the processor, to perform a method listed above.

Some embodiments of a method may include: determining a proximity of a first VR device to a second VR device; detecting a gesture of a user; selecting a chaining mode based on the proximity of the first VR device to the second VR device and the gesture of the user; retrieving, based on a description of a chaining mode, a content identifier, and viewing information; retrieving content specified by the content identifier; and displaying the content on the second VR device based on the chaining mode and the viewing information.

For some embodiments, retrieving the content identifier and viewing information may comprise: sending, to the first VR device, a description of the chaining mode; and receiving, from the first VR device, a content identifier and viewing information.

For some embodiments, the method further may include: transmitting, from the first VR device, a request to establish a connection at the first VR device to a VR experience of the second VR device; and receiving an acknowledgement to establish the connection.

Some embodiments of an apparatus may include: a processor; and a non-transitory computer-readable medium storing instructions that are operative, when executed by the processor, to perform a method listed above.

Some embodiments of a method may include: transmitting, from a first virtual reality (VR) device to a second VR device, a sharing request; receiving, at the first VR device from the second VR device, a sharing acceptance; determining a proximity between the first VR device and the second VR device; selecting a sharing mode; transmitting, from the first VR device to the second VR device, sharing parameters for the sharing mode; receiving, at the first VR device from the second VR device, a content identifier and viewing information; retrieving, at the first VR device, VR content based on the content identifier; and displaying, at the first VR device, the VR content using the viewing information.

For some embodiments, a method may include adjusting the sharing mode.

For some embodiments, adjusting the sharing mode may adjust the sharing mode based on at least one type of data of voice data and gesture data.

For some embodiments, the method may further include presenting, via a user interface of the first VR device, pairing data indicative of the second VR device.

For some embodiments, a method may further include receiving, via the user interface of the first VR device, pairing selection data corresponding to the second VR device.

For some embodiments, the first VR device may be a secondary VR device, and the second VR device may be a primary VR device.

Some embodiments of an apparatus may include: a processor; and a non-transitory computer-readable medium storing instructions that are operative, when executed by the processor, to perform a method listed above.

Some embodiments of a method may include: transmitting a request to establish a chained virtual reality (VR) experience from a first VR device to a second VR device; receiving an acknowledgement to establish a chaining connection between the first and second VR devices; determining a proximity of the second VR device to the first VR device; selecting a chaining mode based on the detected proximity of the second VR device; sending a description of the selected chaining mode to the second VR device; receiving a content identifier and viewing information from the second VR device; retrieving the content specified by the content identifier; and displaying the content on the first VR device based on the chaining mode and the viewing information.

For some embodiments, determining the proximity may determine the proximity based on Bluetooth signal strength.

For some embodiments, determining the proximity may determine the proximity based on an analysis of a scene video feed at the second VR device.

For some embodiments, the method may further include: detecting a gesture of a user in a video of the user; modifying the chaining mode and the viewing parameters based on the gesture; and sending control instructions to the second VR device.

For some embodiments, retrieving the content may retrieve, by each VR device, content from the Internet.

For some embodiments, the first VR device may be a secondary VR device, and the second VR device may be a primary VR device.

Some embodiments of an apparatus may include: a processor; and a non-transitory computer-readable medium storing instructions that are operative, when executed by the processor, to perform a method listed above.

Some embodiments of a method may include: transmitting, from a first virtual reality (VR) device, a request to establish a connection to a VR experience of a second VR device at the first VR device; receiving an acknowledgement to establish the connection; determining, at the first VR device, a proximity of the second VR device relative to the first VR device; selecting an experience sharing level based on the proximity; retrieving VR content based on the experience sharing level; and displaying the VR content at the first VR device.

For some embodiments, determining the proximity may determine the proximity based on Bluetooth signal strength.

For some embodiments, determining the proximity may determine the proximity based on an analysis of a scene video feed at the second VR device.

For some embodiments, the method may further include: detecting a gesture of a user in a video of the user; modifying the experience sharing level based on the gesture; and sending control instructions to the second VR device.

For some embodiments, retrieving VR content may retrieve VR content from a server in the Internet.

For some embodiments, the method may further include retrieving, for the experience sharing level, viewport information of the second VR device, wherein retrieving VR content may retrieve VR content further based on the viewport information.

For some embodiments, determining the proximity may determine the proximity to be in a first range of values, and displaying the VR content may display a summary description of the VR experience of the second VR device on a portion of the display of the first VR device.

For some embodiments, determining the distance may determine the distance to be in a second range of values, and displaying the VR content may display the VR experience of the second VR device on the display of the first VR device in a fully immersive mode.

For some embodiments, the first VR device may be a secondary VR device, and the second VR device may be a primary VR device.

Some embodiments of an apparatus may include: a processor; and a non-transitory computer-readable medium storing instructions that are operative, when executed by the processor, to perform a method listed above.

Some embodiments of a method may include: transmitting, from a first VR device, a request to establish a connection to a VR experience of a second VR device at the first VR device; receiving an acknowledgement to establish the connection; determining, at the first VR device, a distance of the second VR device relative to the first VR device; selecting an experience sharing level from among a plurality of available sharing levels based on the distance; retrieving VR content based on the experience sharing level; and displaying the VR content at the first VR device.

For some embodiments, determining the distance may determine the distance to be in a first range of values, and displaying the VR content may display a summary description of the VR experience of the second VR device on a portion of the display of the first VR device.

For some embodiments, determining the distance determines the distance to be in a second range of values, and displaying the content displays the VR experience of the second VR device on the display of the first VR device in a fully immersive mode.

For some embodiments, determining the distance may determine the distance periodically, selecting the experience sharing level may select an updated experience sharing level if the distance changes, retrieving VR content may retrieve updated VR content based on the updated experience sharing level, and displaying the VR content may display the updated VR content if the distance changes.

For some embodiments, determining the distance may determine the distance based on Bluetooth signal strength.

For some embodiments, determining the distance may determine the distance based on an analysis of a scene video feed at the second VR device.

For some embodiments, retrieving VR content may retrieve VR content from a server in the Internet.

For some embodiments, the method may further include retrieving, for the experience sharing level, viewport information of the second VR device, wherein retrieving VR content may retrieve VR content further based on the viewport information.

For some embodiments, the first VR device may be a secondary VR device, and the second VR device may be a primary VR device.

Some embodiments of an apparatus may include: a processor; and a non-transitory computer-readable medium storing instructions that are operative, when executed by the processor, to perform a method listed above.

Some embodiments of a method may include: receiving, at a first VR device, a request to establish a chained VR experience from a second VR device; transmitting an acknowledgement to establish a chaining connection between the first and second VR devices; receiving a description of a selected chaining mode from the second VR device; and transmitting a content identifier and viewing information from the first VR device to a chained VR device.

For some embodiments, transmitting the content identifier and viewing information may transmit the content identifier and viewing information selected based on the selected chaining mode.

For some embodiments, the first VR device may be a secondary VR device, and the second VR device may be a primary VR device.

Some embodiments of an apparatus may include: a processor; and a non-transitory computer-readable medium storing instructions that are operative, when executed by the processor, to perform a method listed above.

Some embodiments of a method may include: establishing a connection for a virtual reality (VR) experience between a first VR device and a second VR device; selecting an experience sharing level based on a distance between the first VR device and the second VR device; and retrieving VR content based on the experience sharing level.

For some embodiments, a method further may include: detecting a gesture of a user; and adjusting the experience sharing level based on the gesture.

Some embodiments of an apparatus may include: a processor; and a non-transitory computer-readable medium storing instructions that are operative, when executed by the processor, to perform a method listed above.

Some embodiments of a method may include: establishing a connection for a virtual reality (VR) experience between a first VR device and a second VR device; selecting an experience sharing level based on a detected gesture of a user of the first VR device; and retrieving VR content based on the experience sharing level.

Some embodiments of an apparatus may include: a processor; and a non-transitory computer-readable medium storing instructions that are operative, when executed by the processor, to perform a method listed above.

Some embodiments of a method may include sharing at least a portion of a VR experience of a first VR device between the first VR device and a second VR device in accordance with a VR experience sharing level, wherein the VR experience sharing level is based at least in part on at least one of a detected gesture of a user of the second VR device and a determined distance between the second VR device and the first VR device.

Some embodiments of an apparatus may include: a processor; and a non-transitory computer-readable medium storing instructions that are operative, when executed by the processor, to perform a method listed above.

An example method in accordance with some embodiments may include retrieving, by a local VR device, identifiers indicating content identity, content length of time, and/or content orientation.

An example method in accordance with some embodiments may include receiving, by a local VR device, information indicating the state of media displayed by a remote VR device.

An example method in accordance with some embodiments may include communicating real-time data (such as speech) via avatars and speech modules.

An example method in accordance with some embodiments may include retrieving and displaying content with the local VR device being enabled to change orientation and to move independent of the remote VR device.

An example method in accordance with some embodiments may include retrieving and displaying content from the point of view of the remote VR device with the local VR device lacking the ability to change orientation and to move independent of the remote VR device.

An example method in accordance with some embodiments may include retrieving and displaying content from the point of view of the local VR device with the local VR device lacking the ability to change orientation and to move independent of the remote VR device.

An example method in accordance with some embodiments may include displaying shared content in portion of the display for the local device and/or displaying shared content in a picture-in-picture mode.

An example method in accordance with some embodiments may include detecting distance between a local VR device and a remote VR device based on signal strength.

An example method in accordance with some embodiments may include detecting distance by analyzing the content.

An example method in accordance with some embodiments may include manually selecting, controlling, changing, or overriding a selected experience-sharing mode.

Note that various hardware elements of one or more of the described embodiments are referred to as "modules" that carry out (i.e., perform, execute, and the like) various functions that are described herein in connection with the respective modules. As used herein, a module includes hardware (e.g., one or more processors, one or more microprocessors, one or more microcontrollers, one or more microchips, one or more application-specific integrated circuits (ASICs), one or more field programmable gate arrays (FPGAs), one or more memory devices) deemed suitable by those of skill in the relevant art for a given implementation. Each described module may also include instructions executable for carrying out the one or more functions described as being carried out by the respective module, and it is noted that those instructions could take the form of or include hardware (i.e., hardwired) instructions, firmware instructions, software instructions, and/or the like, and may be stored in any suitable non-transitory computer-readable medium or media, such as commonly referred to as RAM, ROM, etc.

Although features and elements are described above in particular combinations, one of ordinary skill in the art will appreciate that each feature or element can be used alone or in any combination with the other features and elements. In addition, the methods described herein may be implemented in a computer program, software, or firmware incorporated in a computer-readable medium for execution by a computer or processor. Examples of computer-readable storage media include, but are not limited to, a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs). A processor in association with software may be used to implement a radio frequency transceiver for use in a WTRU, UE, terminal, base station, RNC, or any host computer.

What is claimed:

1. An apparatus comprising:
a processor; and
a non-transitory computer-readable medium storing instructions operative, when executed by the processor, to cause the apparatus to:
  determine a current value indicating a spatial relationship between a first immersive device and a second immersive device connected to the first immersive device;
  determine a first experience-sharing mode based on a first determined current value,
  wherein the first experience-sharing mode comprises first rules for sharing at least one of content and immersive environment information between the first immersive device and at least the second immersive device;
  provide a first shared immersive experience to a user of the first immersive device, in accordance with the first rules for sharing, and based on a first received set of content relating to an already existing current immersive experience session of a user of the second immersive device;
  determine that the current value relating to both the first immersive device and the second immersive device has changed;
  determine a second experience-sharing mode based on the changed current value,
  wherein the second experience-sharing mode comprises second rules for sharing at least one of content and immersive environment information between the first immersive device and at least the second immersive device; and
  provide a second shared immersive experience to the user of the first immersive device, in accordance with the second rules for sharing, and based on a second received set of content relating to the already existing current immersive experience session of the user of the second immersive device.

2. The apparatus of claim 1, wherein the current value indicating a spatial relationship between the first immersive device and the second immersive device comprises at least one of:
  a current distance between the first immersive device and the second immersive device,
  a current location of the first immersive device relative to that of the second immersive device, or
  a current orientation of the first immersive device with respect to the second immersive device.

3. A method comprising:
determining a current value indicating a spatial relationship between a first immersive device and a second immersive device connected to the first immersive device;
determining a first experience-sharing mode based on a first determined current value,
wherein the first experience-sharing mode comprises first rules for sharing at least one of content and immersive environment information between the first immersive device and at least the second immersive device;
providing a first shared immersive experience to a user of the first immersive device, in accordance with the first rules for sharing, and based on a first received set of content relating to an already existing current immersive experience session of a user of the second immersive device;
determining that the current value relating to both the first immersive device and the second immersive device has changed;
determining a second experience-sharing mode based on the changed current value,
wherein the second experience-sharing mode comprises second rules for sharing at least one of content and immersive environment information between the first immersive device and at least the second immersive device; and
providing a second shared immersive experience to the user of the first immersive device, in accordance with the second rules for sharing, and based on a second received set of content relating to the already existing current immersive experience session of the user of the second immersive device.

4. The method of claim 3, further comprising:
retrieving the first set of content relating to the already existing current immersive experience session of the user of the second immersive device; and
retrieving the second set of content relating to the already existing current immersive experience session of the user of the second immersive device.

5. The method of claim 4, further comprising:
retrieving viewport information of the second immersive device based on the first experience-sharing mode,
wherein retrieving the first set of content comprises retrieving the first set of content further based on the viewport information.

6. The method of claim 3, wherein the current value is a physical distance between the first immersive device and the second immersive device.

7. The method of claim 3, wherein determining the second experience-sharing mode based on the changed current value comprises:
determining the second experience-sharing mode at which the first immersive device and the second immersive device share the second shared immersive experience.

8. The method of claim 7,
wherein the first set of content comprises the first shared immersive experience, and
wherein the second set of content comprises the second shared immersive experience.

9. The method of claim 7, wherein the first shared immersive experience and the second shared immersive experience connect the user of the first immersive device to the already existing immersive experience session of the user of the second immersive device.

10. The method of claim 3, further comprising based on the determined change in current value, displaying an option for the user of the first immersive device to switch to the second experience-sharing mode.

11. The method of claim 10, further comprising:
receiving data indicating the option chosen; and
selecting the first or second experience-sharing mode corresponding to the option chosen,
wherein responsive to receiving data indicating that the user switched to the second experience-sharing mode:

switching the first immersive device to the second experience-sharing mode; and
displaying the second set of content.

12. The method of claim 3,
wherein the first experience-sharing mode is associated with a first mode of immersiveness with the user of the first immersive device,
wherein the second experience-sharing mode is associated with a second mode of immersiveness with the user of the second immersive device, and
wherein the first mode of immersiveness with the user of the first immersive device is greater than the second mode of immersiveness with the user of the second immersive device.

13. The method of claim 3, further comprising displaying a summary description of the already existing current immersive experience session of the user of the second immersive device on a portion of a display of the first immersive device.

14. The method of claim 3, further comprising displaying a visual representation of the already existing current immersive experience session of the user of the second immersive device on a portion of a display of the first immersive device.

15. The method of claim 3, further comprising displaying the already existing current immersive experience session of the user of the second immersive device on a display of the first immersive device in a fully immersive mode.

16. The method of claim 3, further comprising displaying the second set of content on a display of the first immersive device in synchronization with content being displayed on the second immersive device.

17. The method of claim 3, further comprising:
retrieving viewing information for the second immersive device; and
displaying the first set of content based on the viewing information for the second immersive device.

18. The method of claim 17, further comprising:
detecting a gesture of the user of the first immersive device; and
adjusting the viewing information for the second immersive device based on the gesture of the user of the first immersive device; and
displaying the first set of content based on the adjusted viewing information for the second immersive device.

19. The method of claim 3, wherein the current value indicating the spatial relationship between the first immersive device and the second immersive device comprises at least one of:
a current distance between the first immersive device and the second immersive device,
a current location of the first immersive device relative to that of the second immersive device, or
a current orientation of the first immersive device with respect to the second immersive device.

20. The method of claim 3, wherein the first rules further comprise rules for sharing at least one of: viewport information for viewing content, location of one or more virtual objects within an immersive environment, a visual representation of an immersive experience of a user of an immersive device, or a summary description of an immersive experience of a user of an immersive device.

* * * * *